US010822132B2

(12) United States Patent
Spaans et al.

(10) Patent No.: US 10,822,132 B2
(45) Date of Patent: Nov. 3, 2020

(54) HIGH SPEED STAMP APPLICATOR

(71) Applicant: R.E.D. Stamp, Inc., Grand Rapids, MI (US)

(72) Inventors: Jack Edward Spaans, Sparta, MI (US); Michael Thomas Dayton, Lowell, MI (US); Randall Jay Kuiper, Grand Rapids, MI (US); Michael Don-Robert Rupinski, Cedar Springs, MI (US)

(73) Assignee: R.E.D. Stamp, Inc., Grand Rapids, MI (US)

( * ) Notice: Subject to any disclaimer, the term of this patent is extended or adjusted under 35 U.S.C. 154(b) by 277 days.

(21) Appl. No.: 15/894,445

(22) Filed: Feb. 12, 2018

(65) Prior Publication Data

US 2018/0229879 A1 Aug. 16, 2018
US 2019/0023439 A9 Jan. 24, 2019

Related U.S. Application Data

(60) Provisional application No. 62/457,562, filed on Feb. 10, 2017.

(51) Int. Cl.
*B65B 61/26* (2006.01)
*B41K 3/48* (2006.01)
(Continued)

(52) U.S. Cl.
CPC .............. *B65B 61/26* (2013.01); *B41F 17/24* (2013.01); *B41K 3/02* (2013.01); *B41K 3/48* (2013.01);
(Continued)

(58) Field of Classification Search
CPC ..... B65C 2009/401; B41F 17/24; B41K 3/02; B41K 3/48; B41K 3/52; B41K 3/64;
(Continued)

(56) References Cited

U.S. PATENT DOCUMENTS 2,090,919 A 8/1937 Strother et al.
2,216,884 A 10/1940 Kott
(Continued)

FOREIGN PATENT DOCUMENTS

EP 1 004 513 5/2000
JP 2000-268105 9/2002

OTHER PUBLICATIONS

Meyercord Tax Stamping Equipment SSMP Tax Stamping Machine Brochure (2 pages) www.meyercordequipment.com.

*Primary Examiner* — Chelsea E Stinson
*Assistant Examiner* — Himchan Song
(74) *Attorney, Agent, or Firm* — Price Heneveld LLP

(57) ABSTRACT

A tax stamping machine includes an input system that transfers incoming cartons of cigarettes into a conveyor. The input station positions the upper surfaces of the cartons at a predefined height, and the conveyor retains the cartons at the predefined height as the cartons pass through the stamp applicating device. The stamp applicating device includes an opening station, a stamping station, and a closing station. The conveyor includes resilient pulleys that hold the cartons at a predefined height as the cartons move through the opening station, the stamping station, and the closing station such that the upper surfaces of the individual packs of cigarettes are always at the same predefined height regardless of the size of the cartons entering the machine.

21 Claims, 24 Drawing Sheets

(51) Int. Cl.
- B65G 15/60 (2006.01)
- B65D 85/10 (2006.01)
- B41K 3/64 (2006.01)
- B41K 3/52 (2006.01)
- B41K 3/02 (2006.01)
- B41F 17/24 (2006.01)
- B65B 7/20 (2006.01)
- B65B 43/38 (2006.01)
- B65B 51/02 (2006.01)

(52) U.S. Cl.
CPC .......... *B41K 3/52* (2013.01); *B41K 3/64* (2013.01); *B65B 7/20* (2013.01); *B65B 43/38* (2013.01); *B65B 51/023* (2013.01); *B65D 85/1072* (2013.01); *B65G 15/60* (2013.01); *B41P 2217/60* (2013.01); *B65G 2812/02217* (2013.01)

(58) Field of Classification Search
CPC ... B41P 2217/60; B65B 43/38; B65B 51/023; B65B 61/26; B65B 7/20; B65D 85/1072; B65G 15/60; B65G 2812/02217
USPC .......... 198/376, 380; 53/382.1, 382.3, 376.3, 53/376.4, 378.3, 135.1
See application file for complete search history.

(56) References Cited

U.S. PATENT DOCUMENTS

| | | | | |
|---|---|---|---|---|
| 2,516,783 | A | 7/1950 | Matter | |
| 2,916,859 | A | 12/1959 | Klein | |
| 3,025,211 | A | 3/1962 | Winn | |
| 3,328,936 | A | 7/1967 | Billeb | |
| 3,474,727 | A | 10/1969 | Kampf | |
| 3,477,198 | A | 11/1969 | Davis | |
| 3,513,616 | A | 5/1970 | Davis | |
| 3,584,432 | A | 6/1971 | Mayer, Jr. | |
| 3,662,516 | A * | 5/1972 | Wiseman | B65B 43/39 53/76 |
| 3,752,308 | A | 8/1973 | Begemann | |
| 3,765,145 | A | 10/1973 | Davis | |
| 3,894,380 | A * | 7/1975 | Poulsen | B65B 7/20 53/75 |
| 3,902,406 | A * | 9/1975 | Reichert | B31B 50/00 493/132 |
| 4,017,350 | A | 4/1977 | Thomas | |
| 4,063,643 | A | 12/1977 | Wickstead | |
| 4,084,501 | A | 4/1978 | Kerwin et al. | |
| 4,101,362 | A | 7/1978 | Baker et al. | |
| 4,124,969 | A * | 11/1978 | Peyton | B65B 43/39 414/411 |
| 4,184,305 | A | 1/1980 | Baker et al. | |
| 4,263,766 | A | 4/1981 | Baker et al. | |
| 4,265,355 | A | 5/1981 | Davis | |
| 4,317,319 | A | 3/1982 | Price | |
| 4,462,851 | A | 7/1984 | Colegate | |
| 4,503,659 | A | 3/1985 | Sherman | |
| 4,533,586 | A | 8/1985 | Roule et al. | |
| 4,585,504 | A | 4/1986 | Marchetti | |
| 4,589,943 | A | 5/1986 | Kimball et al. | |
| 4,648,933 | A | 3/1987 | Graziano | |
| 4,655,871 | A | 4/1987 | Mattel et al. | |
| 4,657,622 | A | 4/1987 | Paules | |
| 4,664,740 | A * | 5/1987 | Wilkinson | B65C 1/021 101/21 |
| 4,738,359 | A | 4/1988 | Phillips | |
| 4,762,587 | A | 8/1988 | Deal | |
| 4,969,305 | A | 11/1990 | York et al. | |
| 5,019,029 | A | 5/1991 | Calvert | |
| 5,168,883 | A | 12/1992 | Winn | |
| 5,207,331 | A | 5/1993 | Teegarden et al. | |
| 5,214,901 | A * | 6/1993 | Milliner | B65B 61/207 53/136.1 |
| 5,408,927 | A | 4/1995 | Gallagher et al. | |
| 5,440,852 | A | 8/1995 | Lam | |
| 5,582,663 | A | 12/1996 | Matsunaga | |
| 5,748,870 | A | 5/1998 | Tims et al. | |
| 5,794,417 | A | 8/1998 | Mohrman | |
| 5,819,292 | A | 10/1998 | Hitz et al. | |
| 5,963,962 | A | 10/1999 | Hitz et al. | |
| 5,972,153 | A | 10/1999 | Focke et al. | |
| 6,038,570 | A | 3/2000 | Hitz et al. | |
| 6,105,057 | A | 8/2000 | Kuftedjian et al. | |
| 6,106,614 | A | 8/2000 | Stephens et al. | |
| 6,360,208 | B1 | 3/2002 | Ohanian et al. | |
| 6,438,530 | B1 | 8/2002 | Heiden et al. | |
| 6,442,276 | B1 | 8/2002 | Doljack | |
| 6,574,591 | B1 | 6/2003 | Kleinman et al. | |
| 6,595,422 | B1 | 7/2003 | Doljack | |
| 6,668,892 | B2 | 12/2003 | Vasilakes et al. | |
| 6,681,214 | B1 | 1/2004 | Doljack | |
| 6,704,614 | B1 | 3/2004 | Neuwirth | |
| 6,878,222 | B1 * | 4/2005 | Os | B65B 59/02 156/356 |
| 6,889,228 | B1 | 5/2005 | Federwisch | |
| 6,978,932 | B2 | 12/2005 | Margolis | |
| 7,085,725 | B1 | 8/2006 | Leon | |
| 7,283,630 | B1 | 10/2007 | Doljack | |
| 7,371,298 | B2 | 5/2008 | Michalski et al. | |
| 7,437,860 | B2 | 10/2008 | Brandow et al. | |
| 7,506,485 | B2 | 3/2009 | Quinn | |
| 7,533,710 | B2 | 5/2009 | Michalski et al. | |
| 7,568,511 | B2 | 8/2009 | Chojnacki et al. | |
| 8,201,604 | B2 | 6/2012 | Green et al. | |
| 8,499,530 | B2 | 8/2013 | Fisher et al. | |
| 2001/0032138 | A1 | 10/2001 | Janiak et al. | |
| 2002/0083037 | A1 | 6/2002 | Lewis et al. | |
| 2002/0097282 | A1 | 7/2002 | Maltseff | |
| 2003/0069793 | A1 | 4/2003 | Rudolph et al. | |
| 2003/0116285 | A1* | 6/2003 | Michalski | B65C 9/42 156/556 |
| 2003/0141358 | A1 | 7/2003 | Hudson et al. | |
| 2003/0182312 | A1 | 9/2003 | Chen et al. | |
| 2003/0182313 | A1 | 9/2003 | Federwisch et al. | |
| 2003/0182322 | A1 | 9/2003 | Manley et al. | |
| 2003/0182325 | A1 | 9/2003 | Manley et al. | |
| 2003/0182330 | A1 | 9/2003 | Manley et al. | |
| 2004/0030822 | A1 | 2/2004 | Rajan et al. | |
| 2004/0045676 | A1* | 3/2004 | Chojnacki | B65C 9/0015 156/350 |
| 2004/0084130 | A1 | 5/2004 | Michalski et al. | |
| 2007/0214745 | A1 | 9/2007 | Quinn et al. | |
| 2007/0214746 | A1* | 9/2007 | Quinn | B65B 43/39 53/415 |
| 2007/0251189 | A1* | 11/2007 | Brandow | B65B 19/28 53/135.2 |
| 2009/0194230 | A1 | 8/2009 | Brandow et al. | |
| 2017/0341793 | A1* | 11/2017 | Zarur | B65B 57/08 |

* cited by examiner

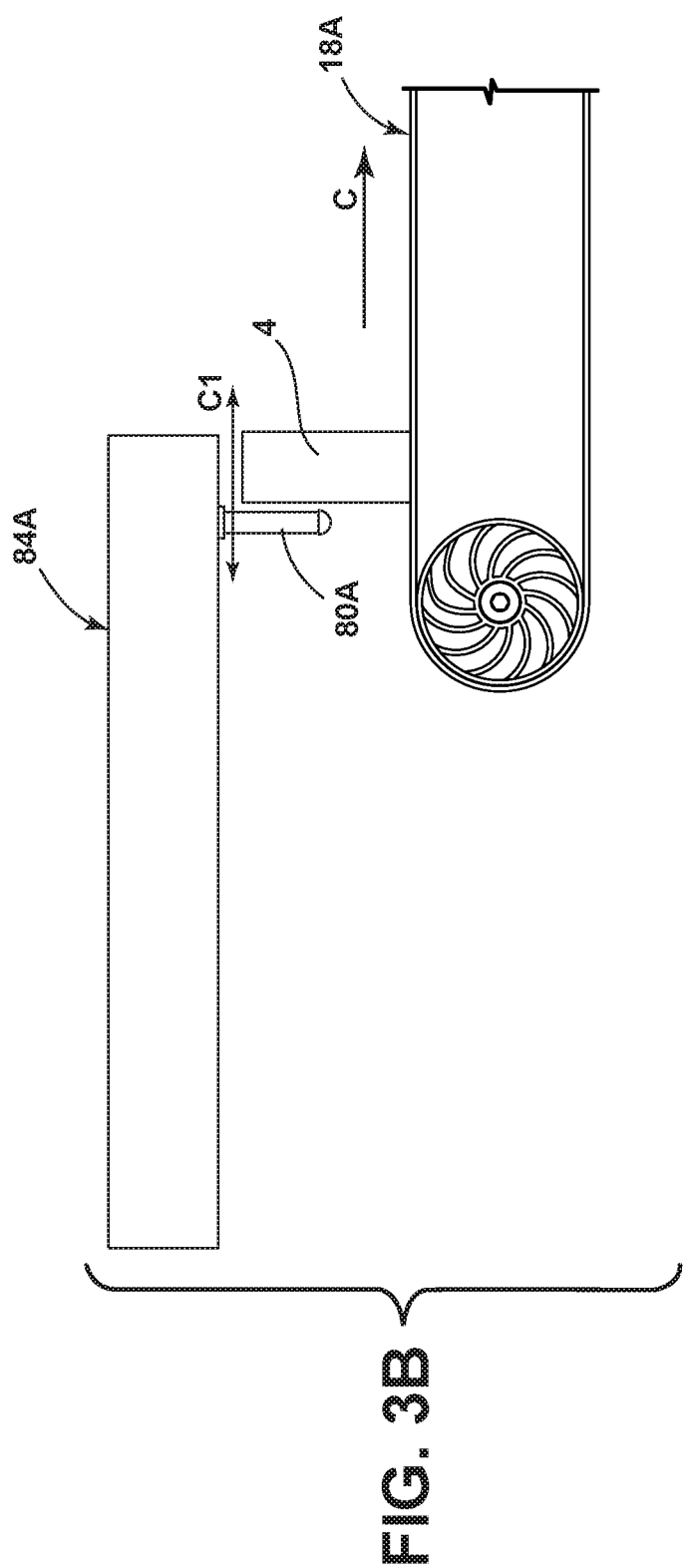

HIGH SPEED STAMP APPLICATOR

CROSS REFERENCE TO RELATED APPLICATION

This application claims the benefit of U.S. Provisional Application No. 62/457,562 filed on Feb. 10, 2017, entitled, "HIGH SPEED STAMP APPLICATOR," the entire contents of which are incorporated herein by reference.

BACKGROUND OF THE INVENTION

Various devices have been developed for stamping or otherwise applying tax information to cartons of cigarettes. Such stamps are normally specific to a given state and/or local region. The stamps are typically applied prior to shipment of the cigarettes to a retailer such as a gas station or the like. Also, a given retailer may order a variety of different brands and sizes of cigarettes for a particular shipment.

Accordingly, tax stamping machines have been designed to stamp cartons of cigarettes having various different types of stamps and different types and sizes of cigarettes and cigarette cartons. One type of tax stamping machine requires manual height and/or width adjustment to setup the machine prior to stamping cartons of a particular size. Attempts have been made to provide a stamping machine that can automatically accommodate cigarette cartons of different sizes without manual height and/or width adjustment by the operator. However, known devices suffer from various drawbacks. For example, the rate at which the machine can stamp cigarette cartons of different sizes may be quite limited. Also, such machines may not be entirely reliable in use, causing the cartons to become damaged or otherwise jammed in the machine if the machine does not function properly when attempting to accommodate cartons of different sizes.

SUMMARY OF THE INVENTION

A tax stamping machine according to one aspect of the present disclosure includes an input station or system that transfers incoming cartons of cigarettes to a conveyor system. The input station may include a powered device that quickly and accurately positions the upper surfaces of the cartons at a predefined vertical location/height as the cartons are fed into the conveyor system. The conveyor system retains the cartons with the upper surfaces at the predefined height as the cartons pass through the stamping machine. The stamping machine includes an opening station that opens flaps of the individual cartons, and the packs of cigarettes are then stamped at a stamping station. The flaps of the cartons are then closed at a closing station, and the cartons are then transferred out of the stamping machine. The conveyor preferably holds the cartons at a predefined height as the cartons move through the opening station, the stamping station, and the closing station such that the upper surfaces of the individual packs of cigarettes are always at the same predefined height, regardless of the size of the cartons entering the machine.

These and other features, advantages, and objects of the present invention will be further understood and appreciated by those skilled in the art by reference to the following specification, claims, and appended drawings.

BRIEF DESCRIPTION OF THE DRAWINGS

FIG. 3B is a partially fragmentary side elevational view of a portion of the stamp applicator of FIG. 3;

Figure 8:
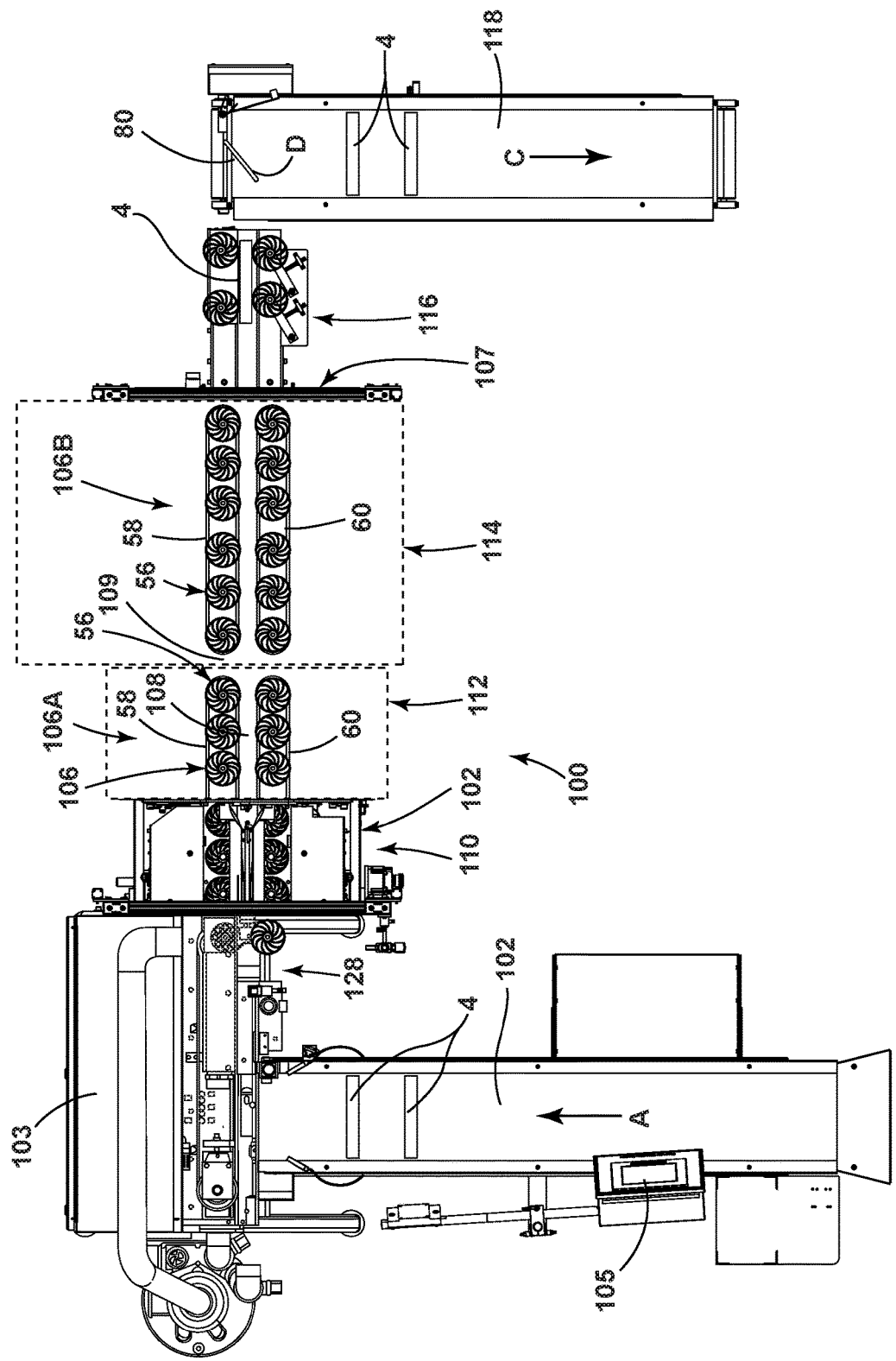
FIG. 8 is a top plan view of a stamp applicator according to another aspect of the present invention.
Figure 9:
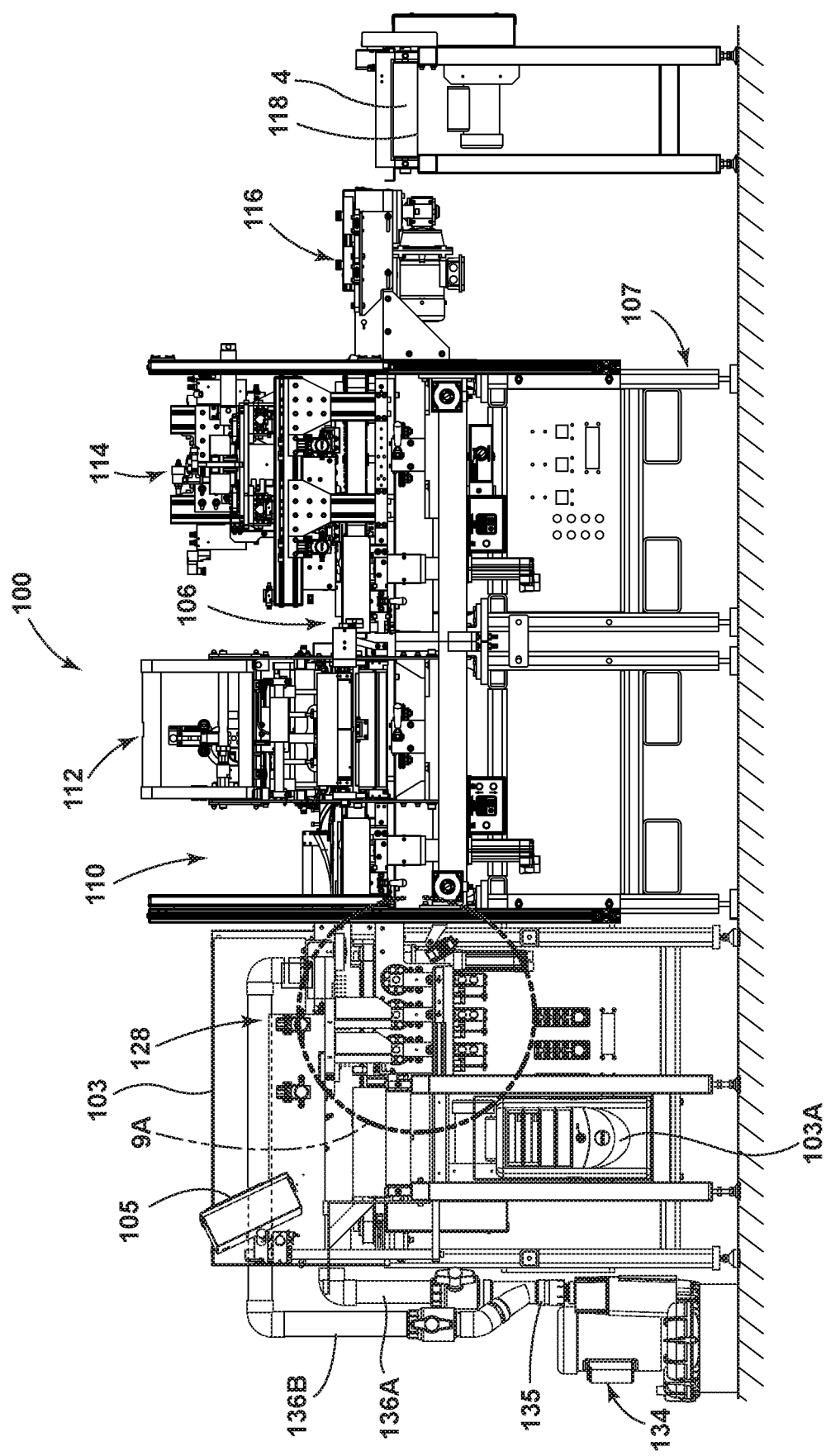
FIG. 9 is a side elevational view of the stamp applicator of FIG. 8.
Figure 12:
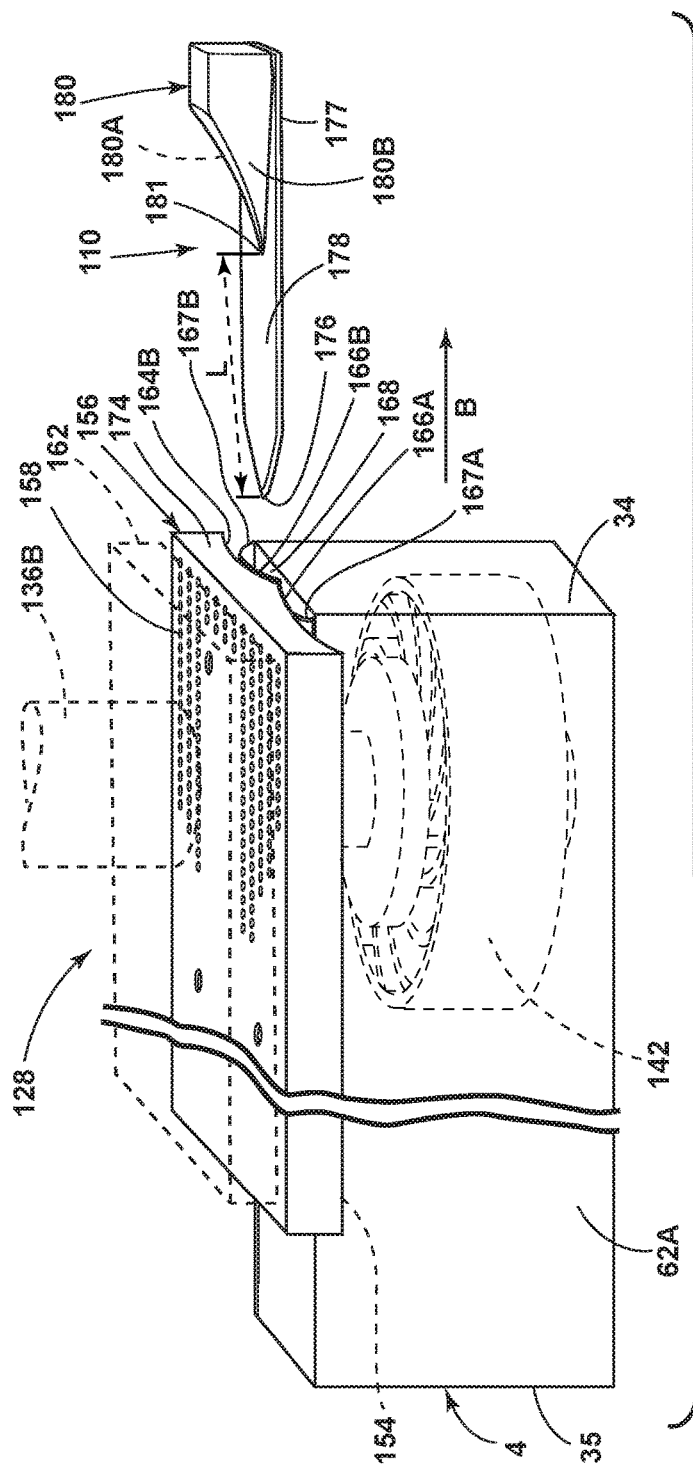
FIG. 12 is a partially fragmentary isometric view of a portion of the induction assembly and a portion of a carton opening station.
Figure 13:
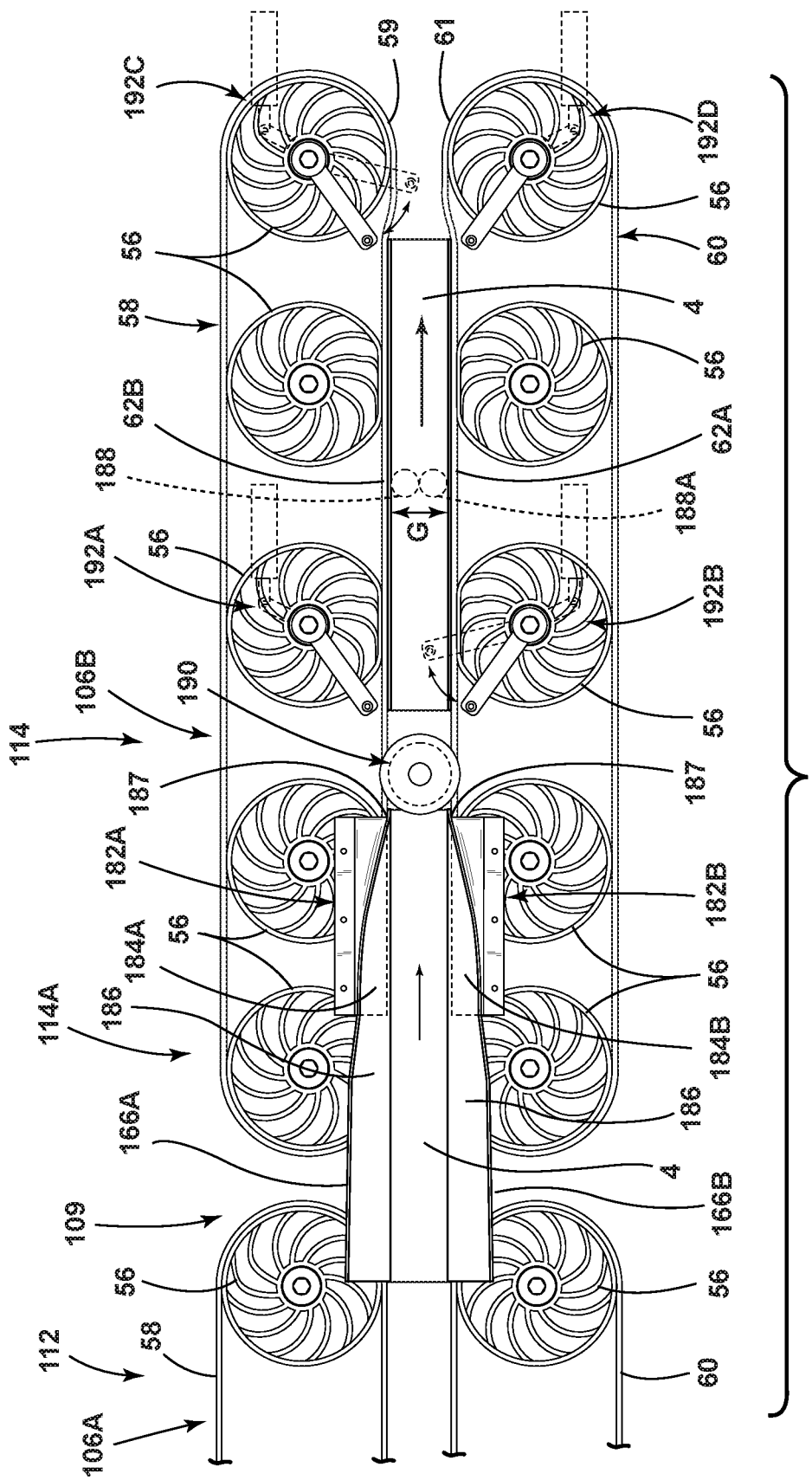
Figure 14:
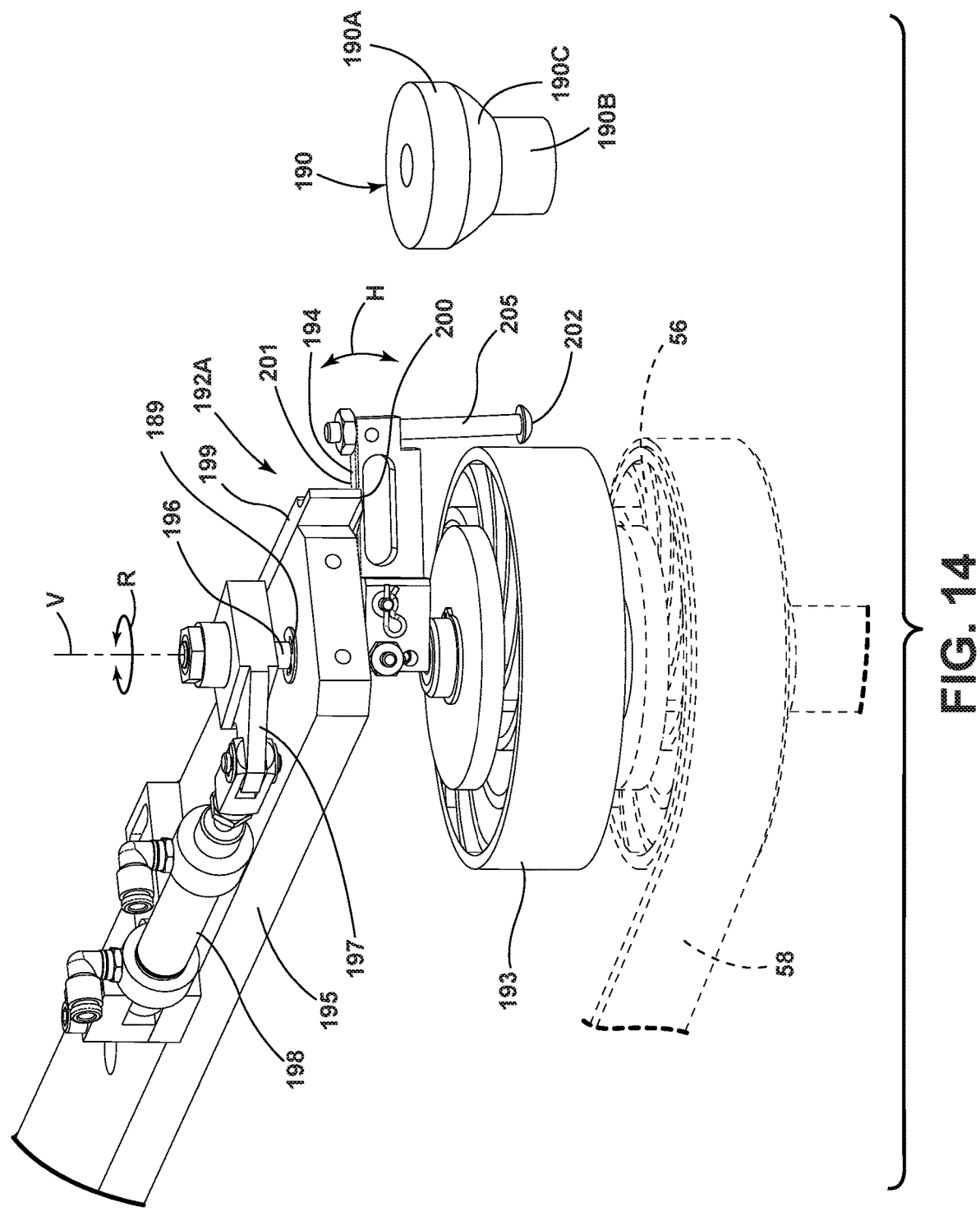
Figure 14A:
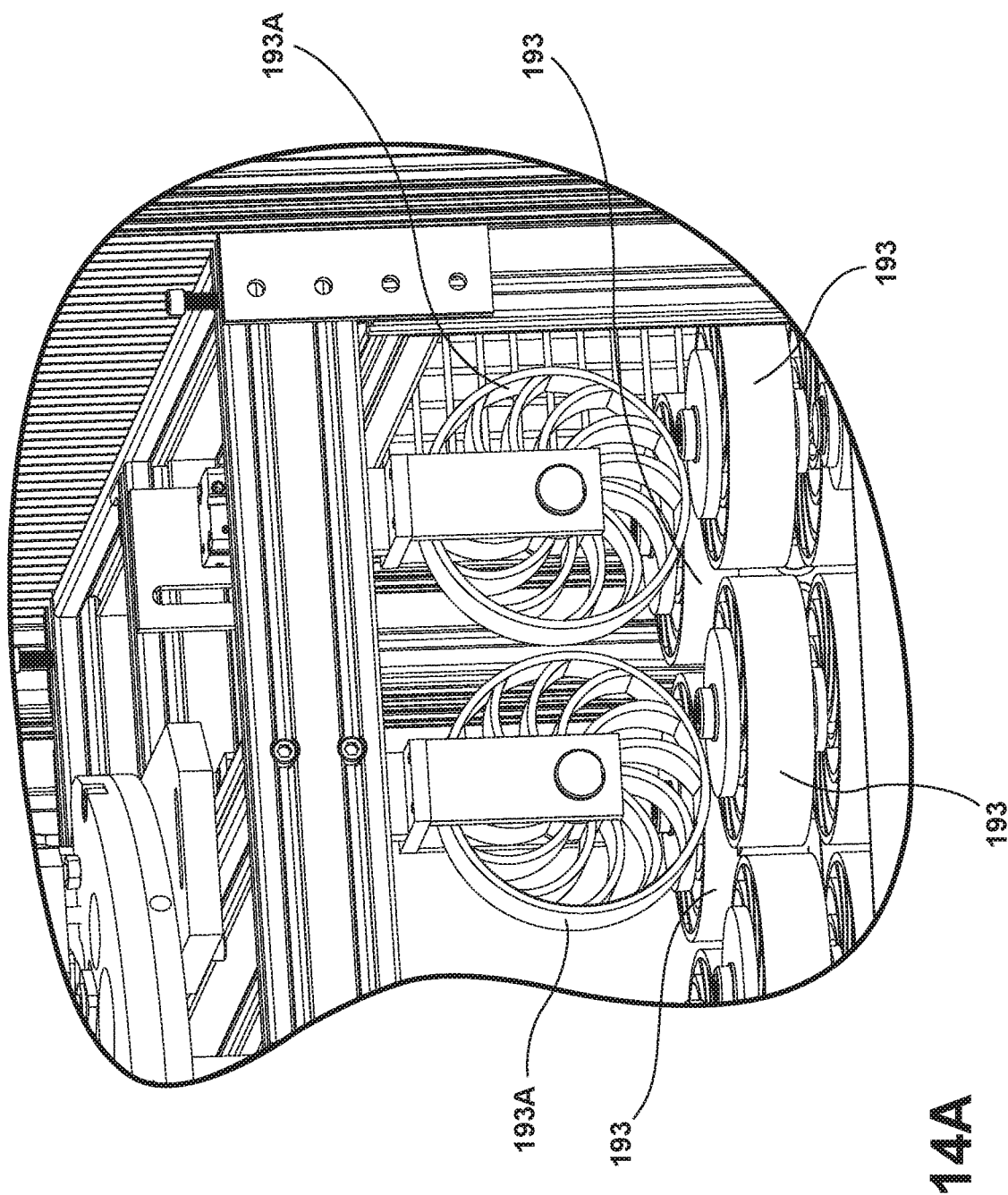
Figure 14B:
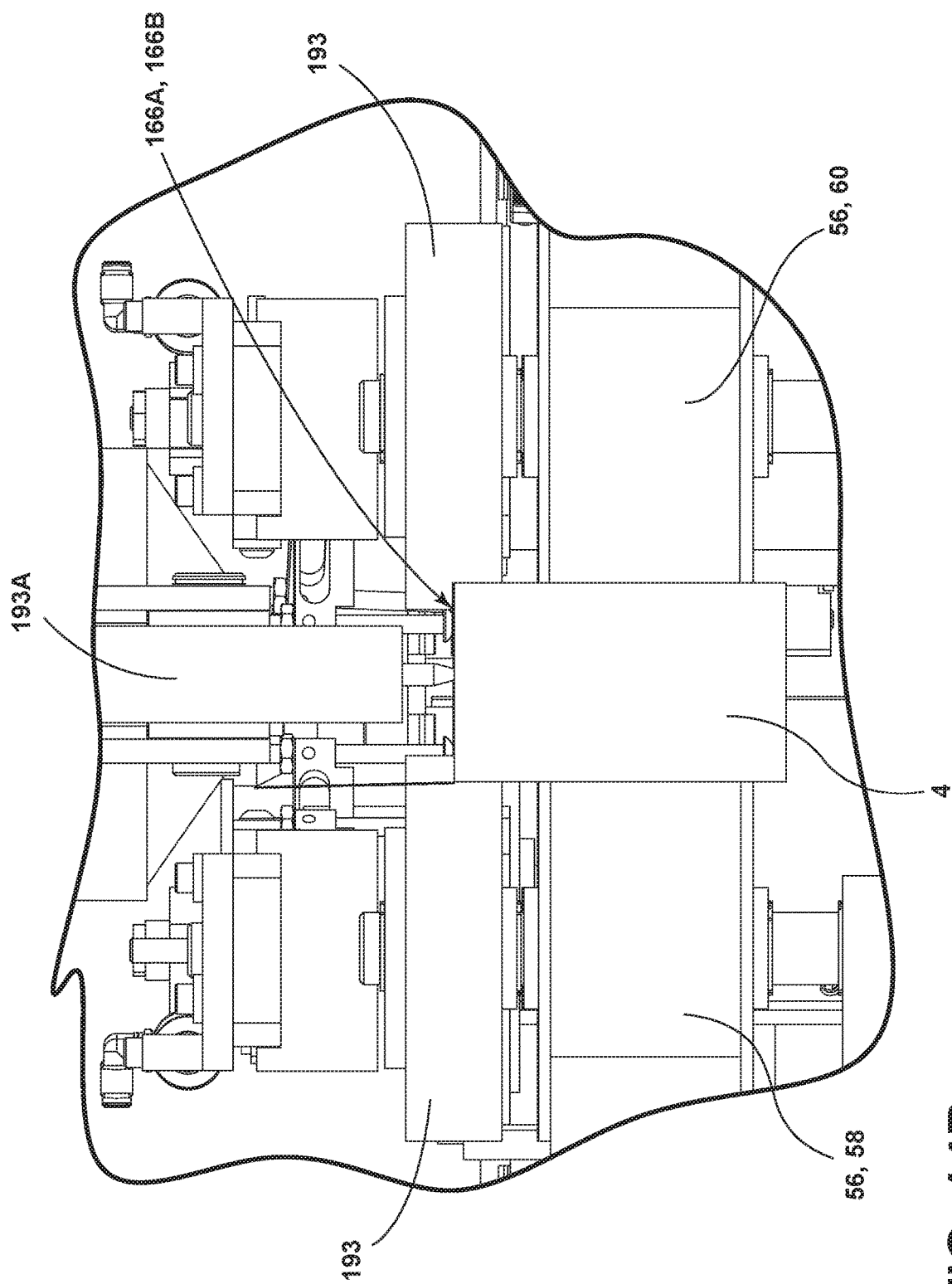
Figure 15:
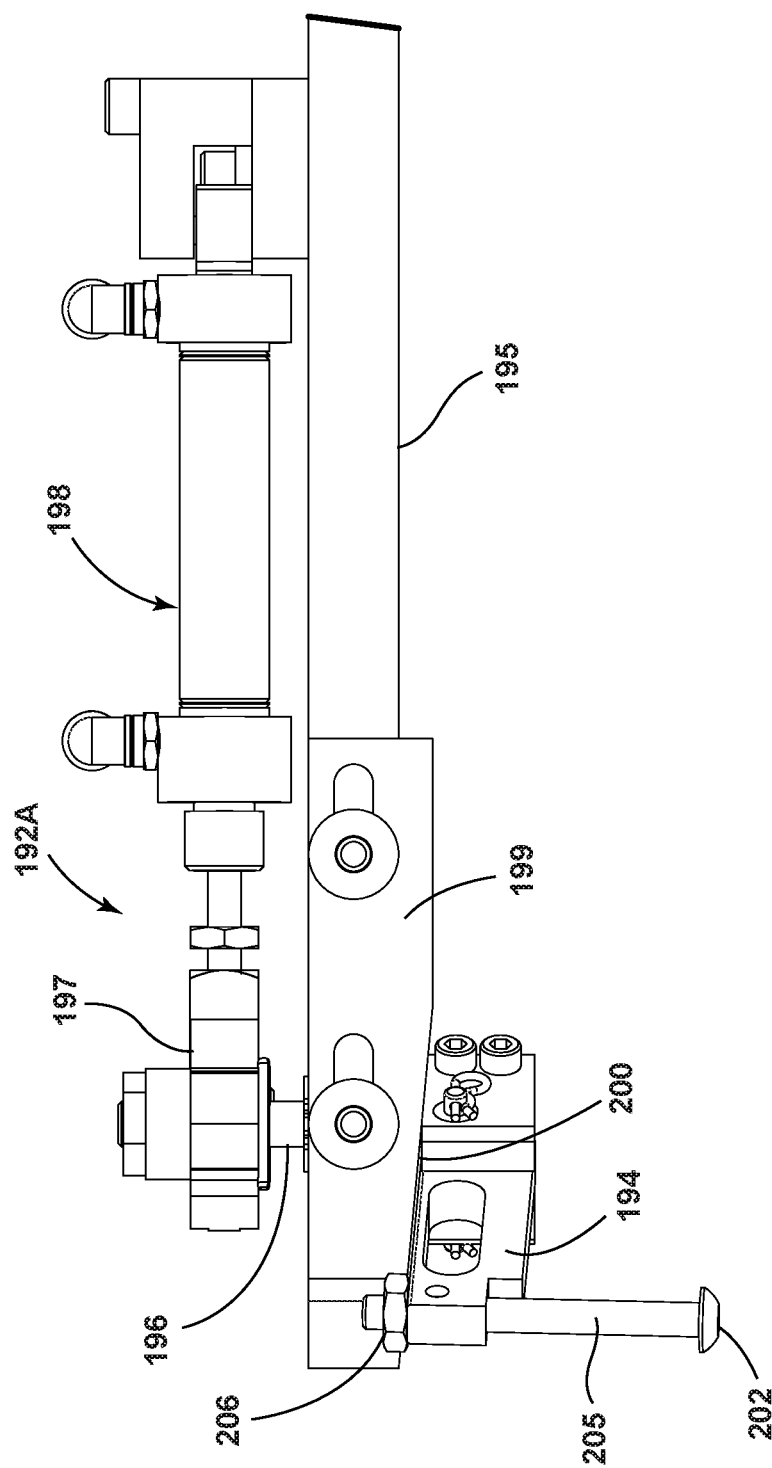
Figure 16:
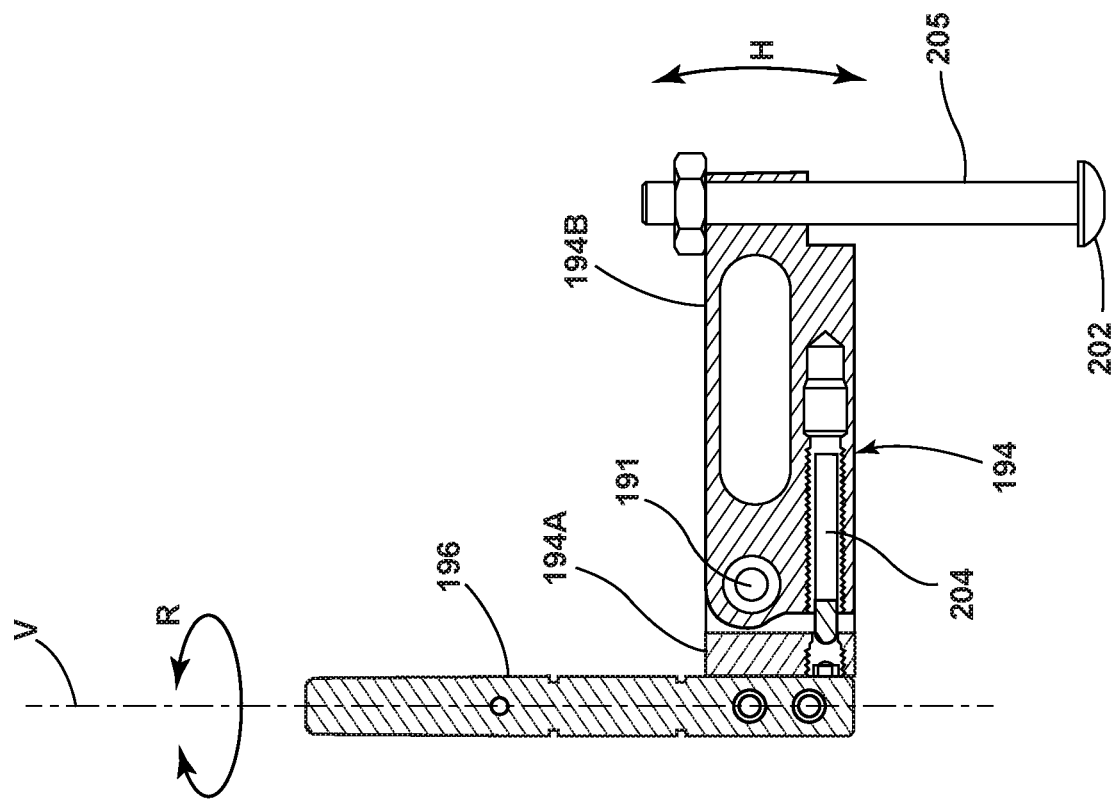

FIB. 12D is a partially fragmentary isometric view of a portion of the induction assembly of FIG. 12;

FIG. 13 is a top plan view of a closing station of the stamp applicator of FIGS. 8 and 9;

FIG. 14 is a partially fragmentary isometric view showing a flap closing mechanism;

FIG. 14A is a partially fragmentary isometric view of a portion of the flap closing mechanism of FIG. 14;

FIG. 14B is a partially fragmentary isometric view of a portion of the flap closing mechanism of FIG. 14;

FIG. 15 is a partially fragmentary isometric view showing the flap closing mechanism of FIG. 14; and FIG. 16 is a cross sectional view of an arm of the flap closing mechanism of FIG. 14.

DETAILED DESCRIPTION

Figure 1:
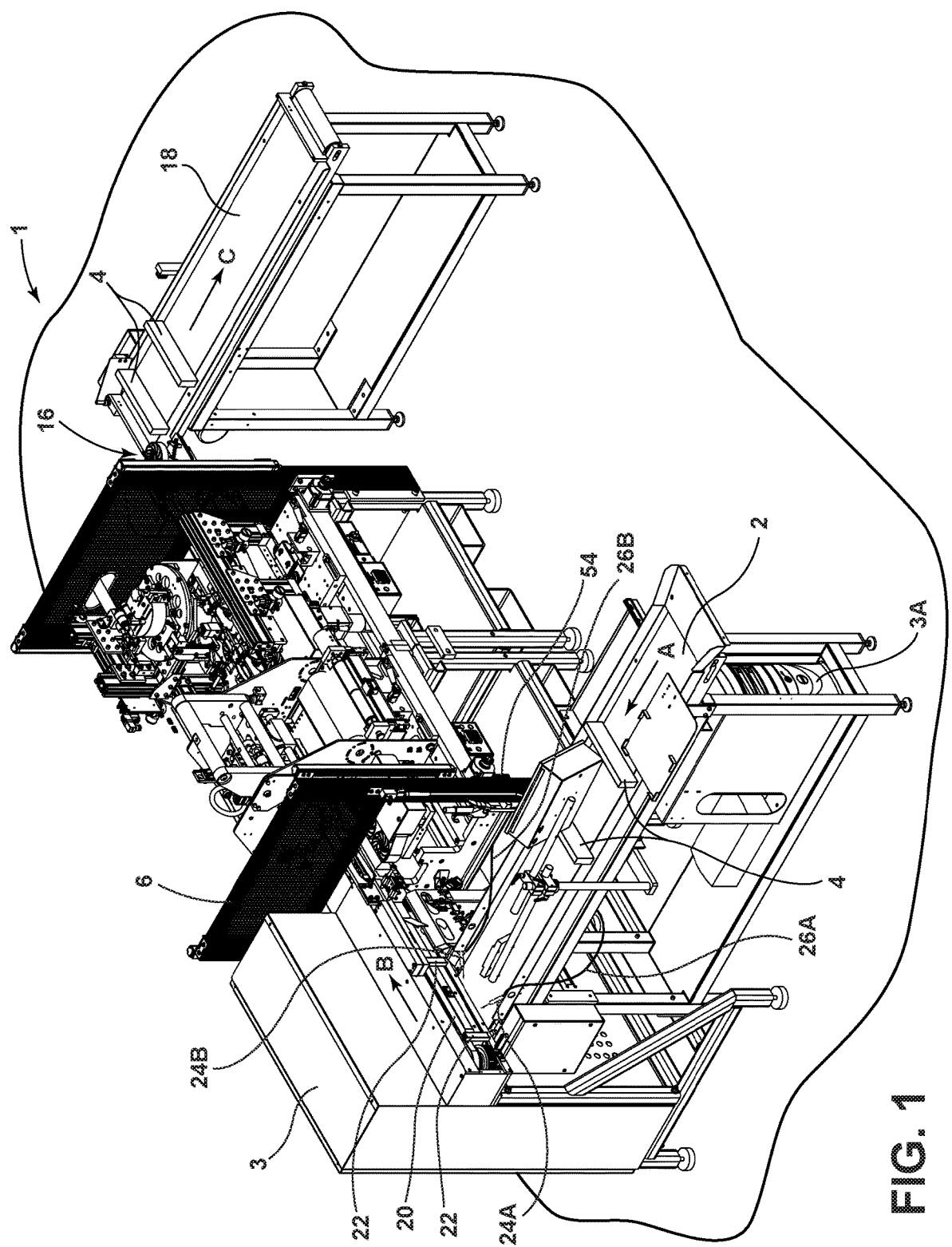
FIG. 1 is an isometric view of a stamp applicator according to one aspect of the present invention.
Figure 2:
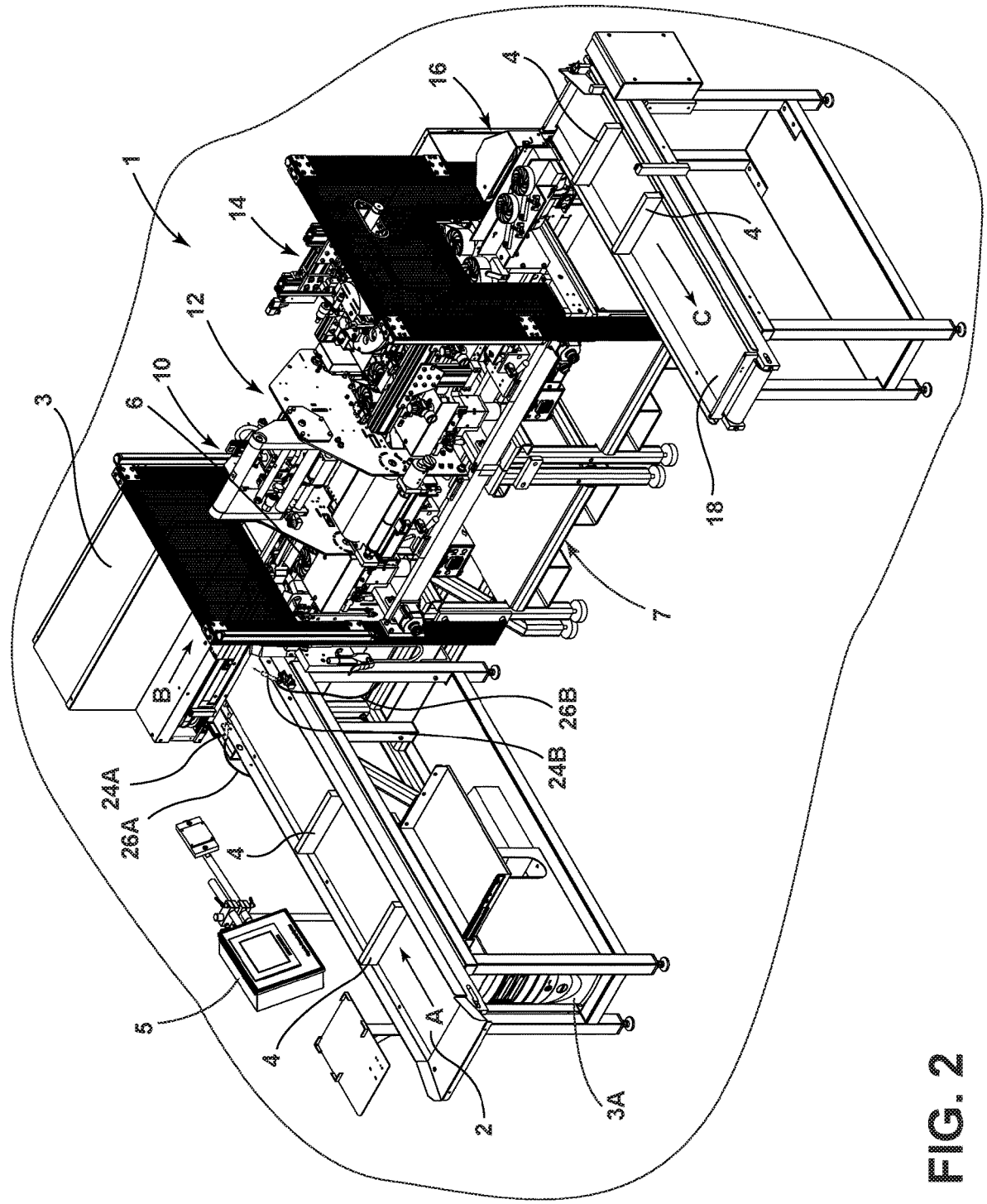
FIG. 2 is an isometric view of the stamp applicator of FIG. 1.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIGS. 1-4, a tax stamping machine 1 according to one aspect of the present invention includes an input conveyor 2 that transports cartons of cigarettes 4 to a main conveyor 6. The main conveyor 6 retains cartons 4 at a specific vertical position and moves the cartons 4 along a linear path 8 (FIG. 3) through an opening station 10, a stamping station 12, and a closing station 14. Main conveyor 6 may have an upstream segment 6A and a downstream section 6B. In use, cartons 4 move through upstream and downstream portions 6A and 6B and move through transition or gap 9 between conveyor segments 6A and 6B while conveyor segments 6A, 6B retain the cartons 4 at a specific vertical location. The opening station 10, stamping station 12, and closing station 14 may be similar to the corresponding components disclosed in U.S. Pat. No. 7,437,860, the entire contents of which are hereby incorporated by reference. As the stamped cartons 4 exit the downstream segment 6B main conveyor 6, the cartons 4 pass through a speed governing mechanism or station 16, and the cartons 4 are deposited onto an exit conveyor 18. Stamping machine 1 includes a controller 3 and a screen 5 that provides a display to a user, and also permits input to controller 3. Stamping machine 1 may optionally include a computer 3A that is operably connected to controller 3. The stamping machine 1 includes a support structure 7 that supports the conveyors 2, 6, 18, stations 10, 12, 14, and the other components of the system.

With reference to FIG. 1, as the cartons 4 move along input conveyor 2, the cartons 4 are moved against a cogged input belt 20 that includes a plurality of "dogs" or cogs 22 that contact trailing surfaces/faces/ends 35 of cartons 4 and push the cartons 4 in the direction of the arrow "B." The cogged input belt 20 may be similar to the cogged belt 41 disclosed in U.S. Pat. No. 7,437,860. As cartons 4 are moved by belt 20, the front surfaces/faces/edges 34 of the cartons 4 may tend to move away from cogged belt 20 and cause jamming. In order to prevent this, stamping machine 1 may include air nozzles 24A and 24B that are configured to direct streams of air A1, A2, respectively, against cartons 4 that are positioned against belt 20. This ensures that the cartons 4 remain in place against dogged belt 20 as the cartons 4 move in the direction of the arrow B. Air lines 26A and 26B supply air to air nozzles 24A and 24B. It will be understood that a single air nozzle 24A or 24B may be utilized, or two or more air nozzles may be utilized. The tax stamping machine 100 described below in connection with FIGS. 8-15 may optionally include one or more air nozzles 24A, 24B.

As the cartons 4 are moved in the direction of the arrow B by cogged input belt 20, the cartons 4 are moved into a ramp station 28. Ramp station 28 raises cartons 4 as the cartons 4 enter upstream end 54 (FIG. 3) of upstream segment 6A of main conveyor 6.

Figure 6:
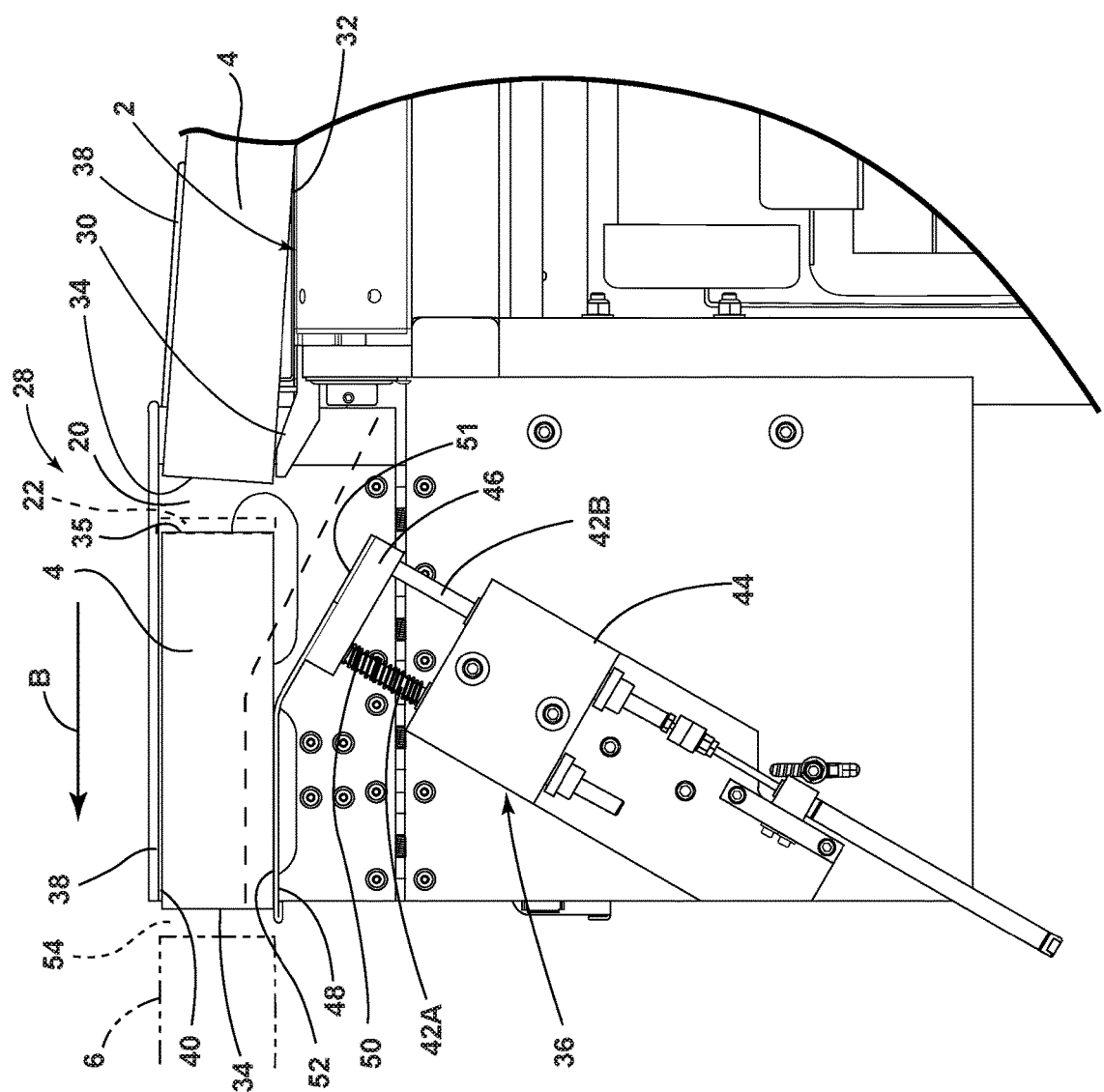
FIG. 6 is a partially fragmentary side elevational view of a portion of the stamp applicator of FIG. 3 taken along the line VI-VI.

With further reference to FIG. 6, ramp station 28 includes a fixed ramp 30. As the cartons 4 are moved in the direction of the arrow B by belt 20, the lower surfaces/faces/edges 32 of cartons 4 slide along ramp 30, thereby causing the forward ends 34 of the cartons 4 to move upwardly. A lift mechanism 36 then pushes the cartons 4 upwardly until upper surfaces/faces/edges 38 of the cartons 4 come into contact with a downwardly-facing guide surface 40 that is mounted to support structure 7. The location (height) of guide surface 40 may be fixed relative to support structure 7, or the location may be adjustable. The lift mechanism 36 includes a pair of rods 42A and 42B that are slidably received in a block 44. An end block 46 is fixed to the outer ends of the rods 42A and 42B, and a lift or slide member 48 is attached to the end block 46. A coil spring 50 biases the end block 46 and slide member 48 upwardly and forwardly away from the block 44. The slide member 48 has an angled ramp or slide surface 51, and a horizontal flat slide surface portion 52. The lower surfaces/faces/edges 32 of the cartons 4 slide along surfaces 51 and 52 as the cartons 4 move through the ramp station 28. Due to the bias of coil spring 50, the slide member 48 biases the cartons 4 upwardly with upper surfaces/faces/edges 32 in sliding engagement with downwardly-facing guide surface 40. Once the cartons 4 reach a fully raised position (i.e. with upper surfaces/faces/edges 38 parallel to, and in contact with, guide surface 40) the forward ends 34 of the cartons 4 move into upstream end 54 of upstream segment 6A of main conveyor 6. The guide surface 40 ensures that the upper side 38 or surface of each carton 4 is at the same height as the cartons 4 enter the main conveyor 6. Thus, cartons 4 having different heights are all fed into main conveyor 6 with the upper side 38 at the same vertical location defined by guide surface 40. As discussed in more detail below, the main conveyor 6 grips the cartons 4 as the cartons 4 pass through the opening station 10, stamping station 12, and closing station 14, and maintain the cartons at the same vertical location as the cartons 4 pass through stations 10, 12, and 14. In this way, the height of the opening station 10, stamping station 12, and closing station 14 do not need to be adjusted to accommodate cartons having different heights. The unique arrangement of the machine 1 permits cartons 4 to be moved through the opening station 10, stamping station 12, and closing station 14 at a very high speed (e.g. 600 feet per minute or more).

Figure 5:
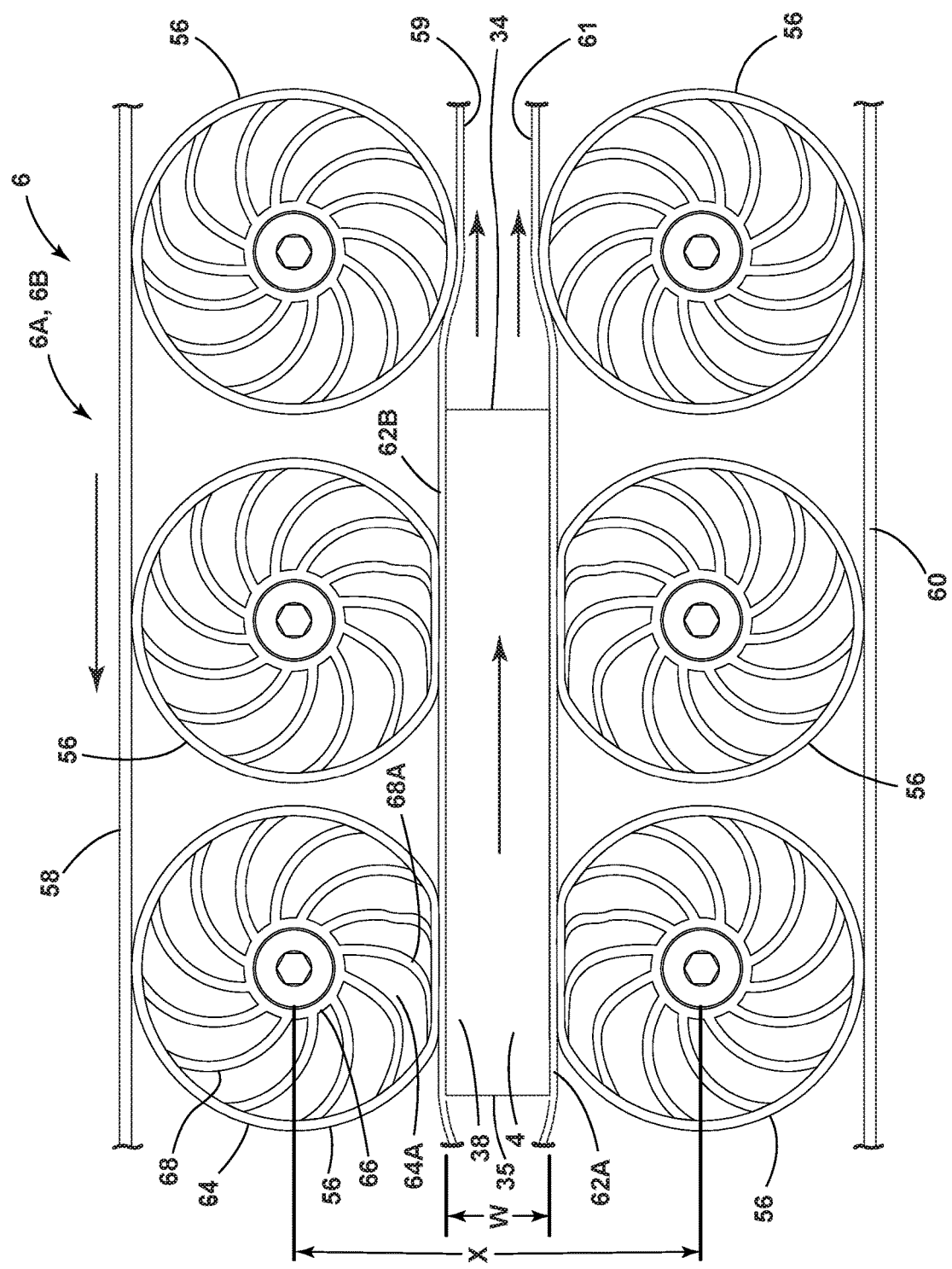
FIG. 5 is an enlarged view of a portion of the stamp applicator of FIG. 3.

With further reference to FIG. 5, upstream and downstream segments 6A and 6B of main conveyor 6 include a plurality of resilient pulleys 56 that drive flexible belts 58 and 60. Upstream and downstream segments 6A and 6B, respectively, may have substantially the same construction and operation as shown in FIG. 5. One or more of the pulleys 56 are operably connected to a powered actuator (e.g. an electric motor) that is controlled by controller 3. Resilient pulleys 56 may be made from a flexible elastomeric material such as a suitable polymer. The outer surfaces 59 and 61 of flexible belts 58 and 60, respectively, are made of a material (e.g. rubber or other suitable elastomeric material) having a high coefficient of friction, and the surfaces 59 and 61 of belts 58 and 60 frictionally engage the opposite side faces or surfaces 62A and 62B of the cartons 4 as the cartons 4 move along the main conveyor 6. Each resilient pulley 56 includes an outer rim 64, a center portion 66, and a plurality of curved spokes or webs 68 that extend between the center portion 66 and rim 64 of each pulley 56.

The resilient pulleys 56 on opposite sides of cartons 4 are spaced apart a distance X. The distance X is selected such that, as cartons 4 pass between resilient pulleys 56, the rim 64 and legs 68 flex as shown at 64A and 68A, thereby resiliently biasing the surfaces 59 and 61 of flexible belts 58 and 60 into contact with opposite sides 62A and 62B of cartons 4. Cartons 4 may have a width "W" that varies for various cartons 4, depending upon the brand and type of cigarettes. However, the width W generally falls within in a known range of sizes (e.g. 1.38 inches to 2.06 inches). Accordingly, the spacing X between resilient pulleys 56 may be selected such that the resilient pulleys 56 cause surfaces 59 and 61 of belts 58 and 60 to provide proper grip to support cartons 4 having various widths W falling within a selected range (about 1.4 inches to about 2.0 inches). Alternatively, the distance X may be adjusted to accommodate cartons 4 of different widths W. For example, the tax stamping machine 1 may include an automatic size measuring feature as disclosed in U.S. Pat. No. 7,437,860 that provides input to controller 3, which may actuate one or more powered actuators (not shown) to shift pulleys 56 to adjust distance X if required to accommodate cartons 4 having different widths.

Conveyor segments 106A and 106B of main conveyor 106 of a stamping machine 100 according to another aspect of the present invention (FIGS. 8-15) may have substantially the same construction and operation as described above in connection with FIG. 5. Main conveyor 106 may include an upstream segment 106A and a downstream segment 106B corresponding to the upstream and downstream segments 6A and 6B of stamping machine 1 of FIGS. 1-7. In use, cartons 4 are retained at a selected height by conveyor segments 106A and 106B, and cartons move through transition or gap 109 between conveyor segments 106A and 106B without changing height.

Figure 3:
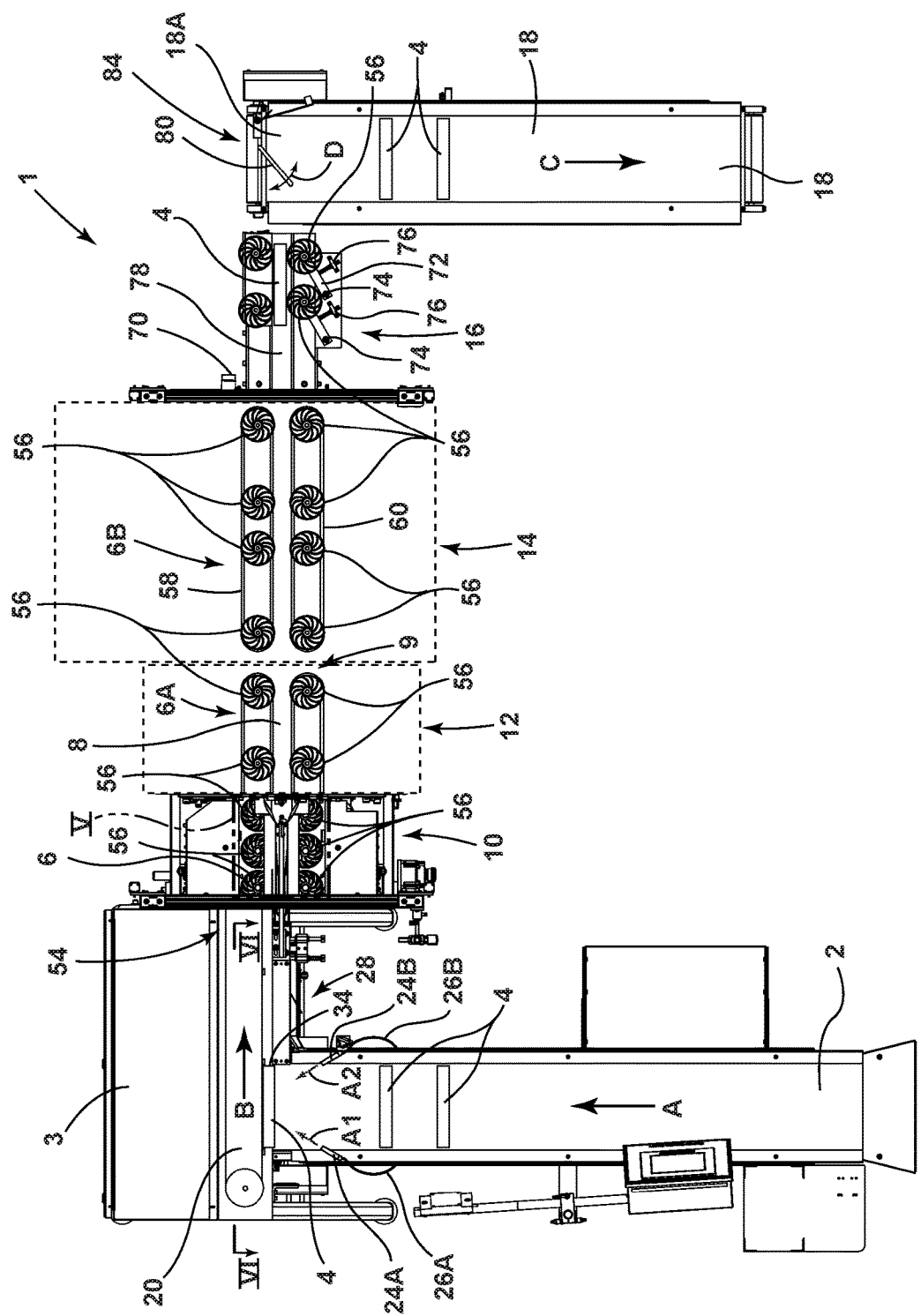
FIG. 3 is a plan view of the stamp applicator of FIGS. 1 and 2.
Figure 7:
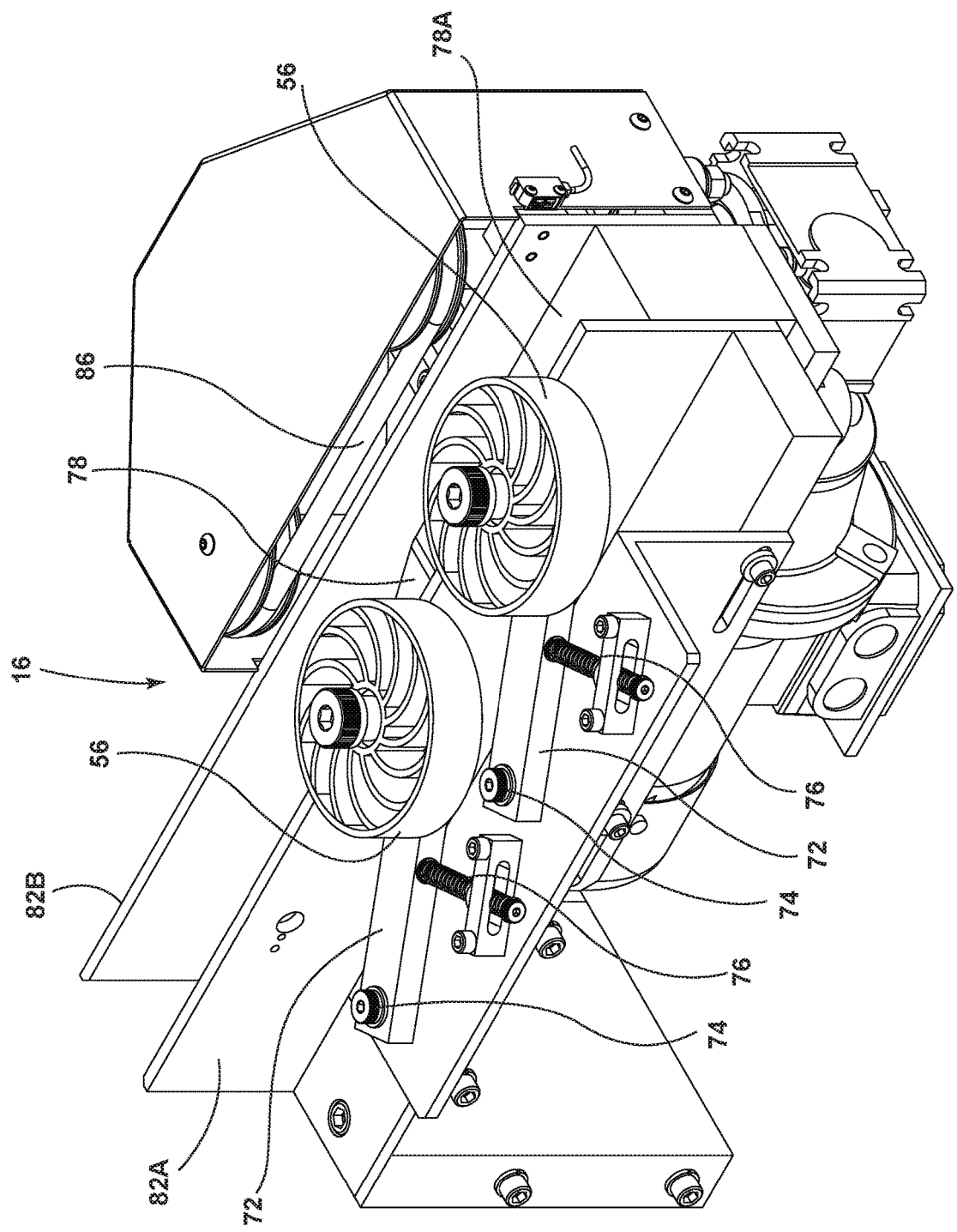
FIG. 7 is an isometric view of a speed governing mechanism.

Referring to FIGS. 3 and 7, after the cartons 4 move through closing station 14, the cartons 4 exit downstream end 70 of main conveyor 6, and move into speed regulating device 16. Speed regulating device 16 includes a pair of resilient pulleys 56 that are mounted on arms 72 for rotation about pivots 74. Coil springs 76 bias the arms 72 and thereby bias the resilient pulleys 56 into contact with cartons 4 as the cartons 4 pass through the speed regulating device 16. Pulleys 56 bias the cartons 4 into contact with a belt 86. Belt 86 is driven at a constant speed that is lower than the speed of belts 58 and 60 of main conveyor 6. Belt 86 has lower friction than belts 58 and 60, and the belts 58 and 60 push the cartons into belt 86 a short distance (e.g. approximately one inch), and the belt 86 then moves the carton 4 through speed regulating device 16 at a reduced speed. As the cartons 4 move through the speed regulating device 16, the cartons 4 are guided by side plates 82A and 82B and a ramp surface 78 onto exit conveyor 18. A horizontal ramp surface 78A is positioned directly adjacent exit conveyor 18 at the same height (or slightly above) exit conveyor 18. The ramp surfaces 78 and 78A ensures that the bottom surfaces of the cartons 4 are at, or slightly above, upper surface 18A of exit conveyor 18. Ramp surface 78 may be inclined to raise cartons 4 as shown in FIG. 7. Alternatively, the ramp surface 78 may be declined if cartons 4 exit main conveyor 6 at a height that is above surface 18A of exit conveyor 18.

Figure 3A:
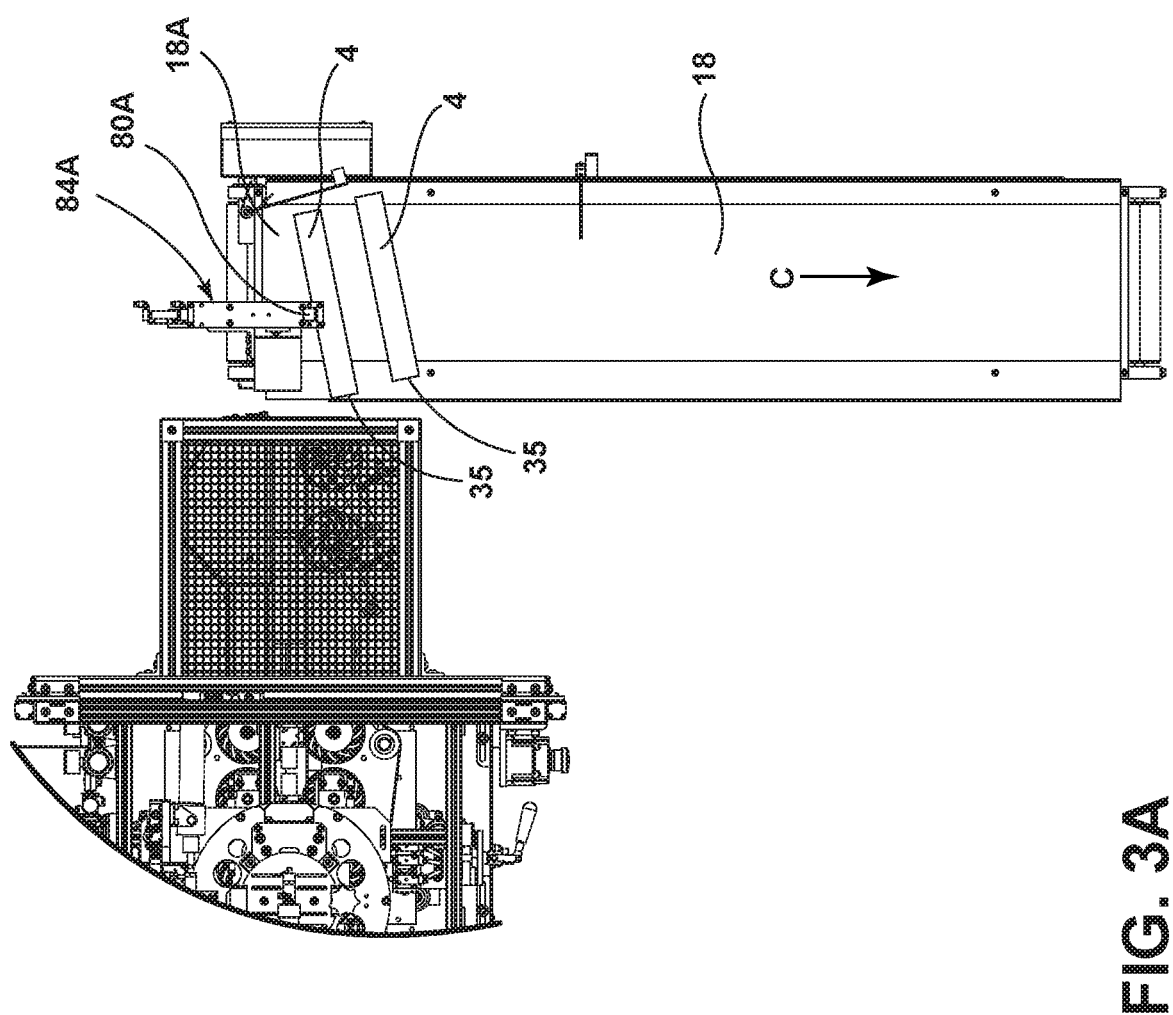
FIG. 3A is a partially fragmentary view of a portion of the stamp applicator of FIG. 3.
Figure 4:
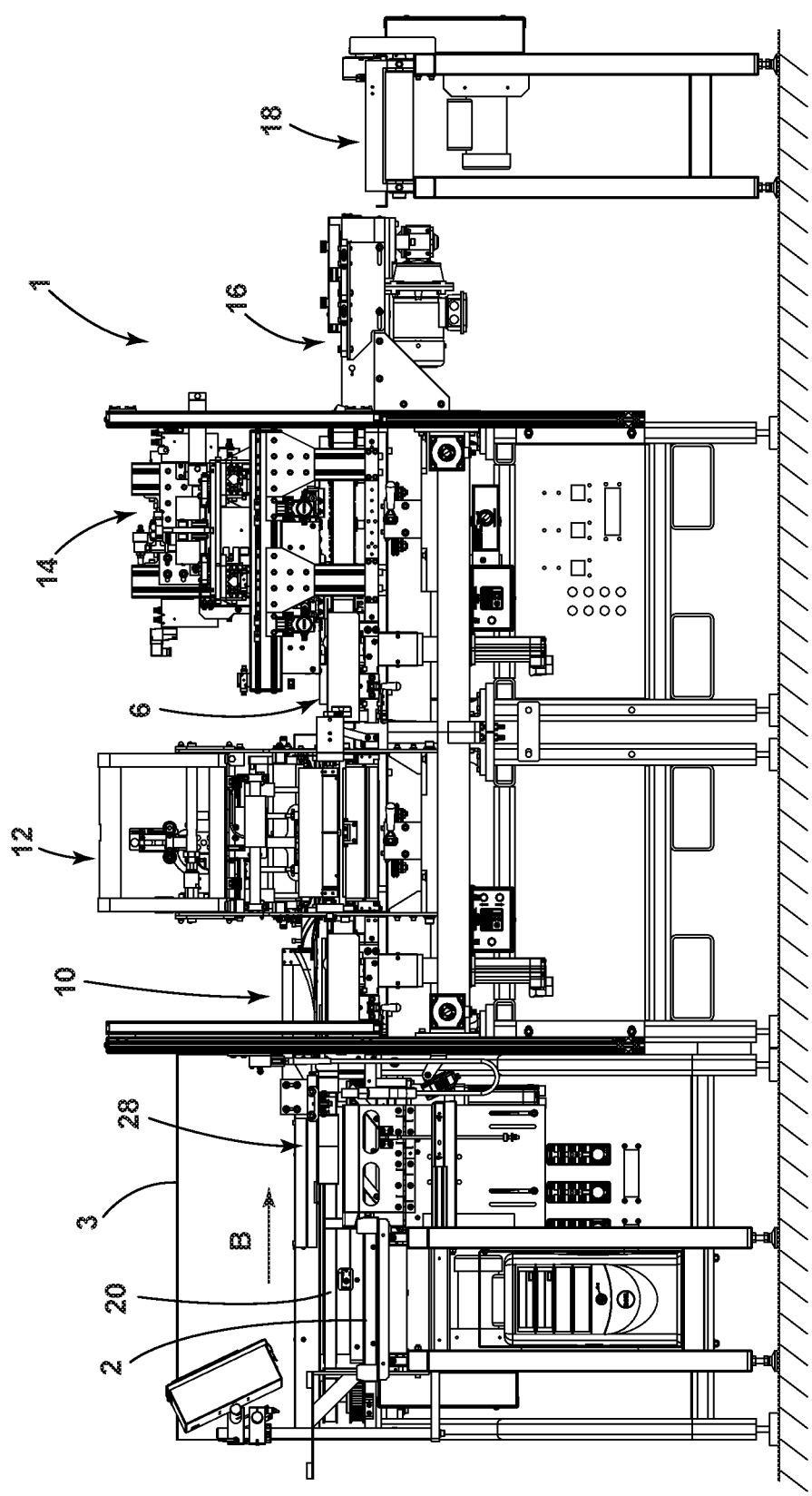
FIG. 4 is a side elevational view of the stamp applicator of FIGS. 1-3.

As discussed above, the main conveyor 6 holds the cartons 4 at a specified height, such that the upper surface 38 of each carton 4 is always at the same height as the carton 4 moves through opening station 10, stamping station 12, and closing station 14 regardless of the height of each individual carton 4. As the cartons 4 exit main conveyor 6, the cartons 4 slide on ramp surface 78 to thereby ensure that the lower surfaces of each carton 4 are at the proper height to transition the cartons 4 onto exit conveyor 18. Thus, ramp surface 78 ensures that cartons 4 are properly positioned for transition onto surface 18A of conveyor 18 regardless of the heights of different individual cartons 4. Restated, ramp surface 78 transitions cartons 4 from a vertical position that is based on an upper edge or surface 38 (FIG. 6) to a vertical position that is based on a lower edge or surface 32 of cartons 4. A powered tapping mechanism 84 at upstream end 18A of exit conveyor 18 may include a pivoting arm 80 (FIG. 3) or a translating arm 80A (FIG. 3A). Arms 80 and 80A push cartons 4 onto conveyor 18 as shown in FIGS. 3 and 3A, respectively. Arm 80A may comprise a downwardly-extending bar or rod that may be shifted (moved) linearly/reciprocating in the direction of the arrow "C1" as shown in FIG. 3B. Mechanism 84A may comprise a linear pneumatic or electric mechanism that is operably connected to controller 3 to push the cartons 4 onto the exit conveyor 18. The arm 80A moves the trailing ends 35 of cartons 4 out of the way as shown in FIG. 3A so that the next carton 4 can be shifted onto exit conveyor 18. The pulleys 56 bias the cartons 4 against belt 86 and ensure that the cartons are positioned directly adjacent arm 80, 80A so that the arm 80, 80A consistently engages the cartons 4 and shifts each carton 4 out of the way of the next carton 4. The arm 80, 80A also preferably rotates cartons 4 about a vertical axis a few degrees (e.g. 30°-45°) on exit conveyor 18. This reduces the tendency of cartons 4 to tip over on conveyor 18 due to the acceleration of the cartons 4 when initially being positioned on moving conveyor 18.

With further reference to FIGS. 8 and 9, a tax stamping machine 100 according to another aspect of the present invention includes a support structure 107, an input conveyor 102, and a controller 103 that is operably connected to a control/display screen 105. Screen 105 may comprise a touch screen to enable user input to operate tax stamping machine 100. The tax stamping machine 100 includes a main conveyor 106 that may be substantially similar to the conveyor 6 described in more detail above in connection with FIGS. 1-7. In particular, the main conveyor 106 may include upstream segment 106A and downstream segment 106B, each having a plurality of resilient pulleys 56 and flexible belts 58 and 60 that retain cartons 4 at a specific height as the cartons move through the main conveyor 106 along linear path 108 in substantially the same manner as discussed above in connection with FIG. 5.

Tax stamping machine 100 includes an opening station 110, a stamping station 112, and a closing station 114. The main conveyor 106 retains cartons 4 at a specific height as the cartons 4 move through opening station 110, stamping station 112, and closing station 114. The cartons 4 then pass through a speed regulating device 116 to reduce the speed of the cartons 4. The cartons 4 are then moved onto an exit conveyor 118 by speed regulating device 116. The conveyor 102 of stamping machine 100 is substantially similar to the input conveyor 2 of tax stamping machine 1. The stamping station 112 of tax stamping machine 1 is substantially similar to the stamping station 12 of tax stamping machine 1, and speed regulating device 116 of tax stamping machine 100 is substantially similar to the speed regulating device 116 of tax stamping machine 1. Similarly, the exit conveyor 118 is substantially similar to the exit conveyor 18 of FIGS. 1-4.

Figure 9A:
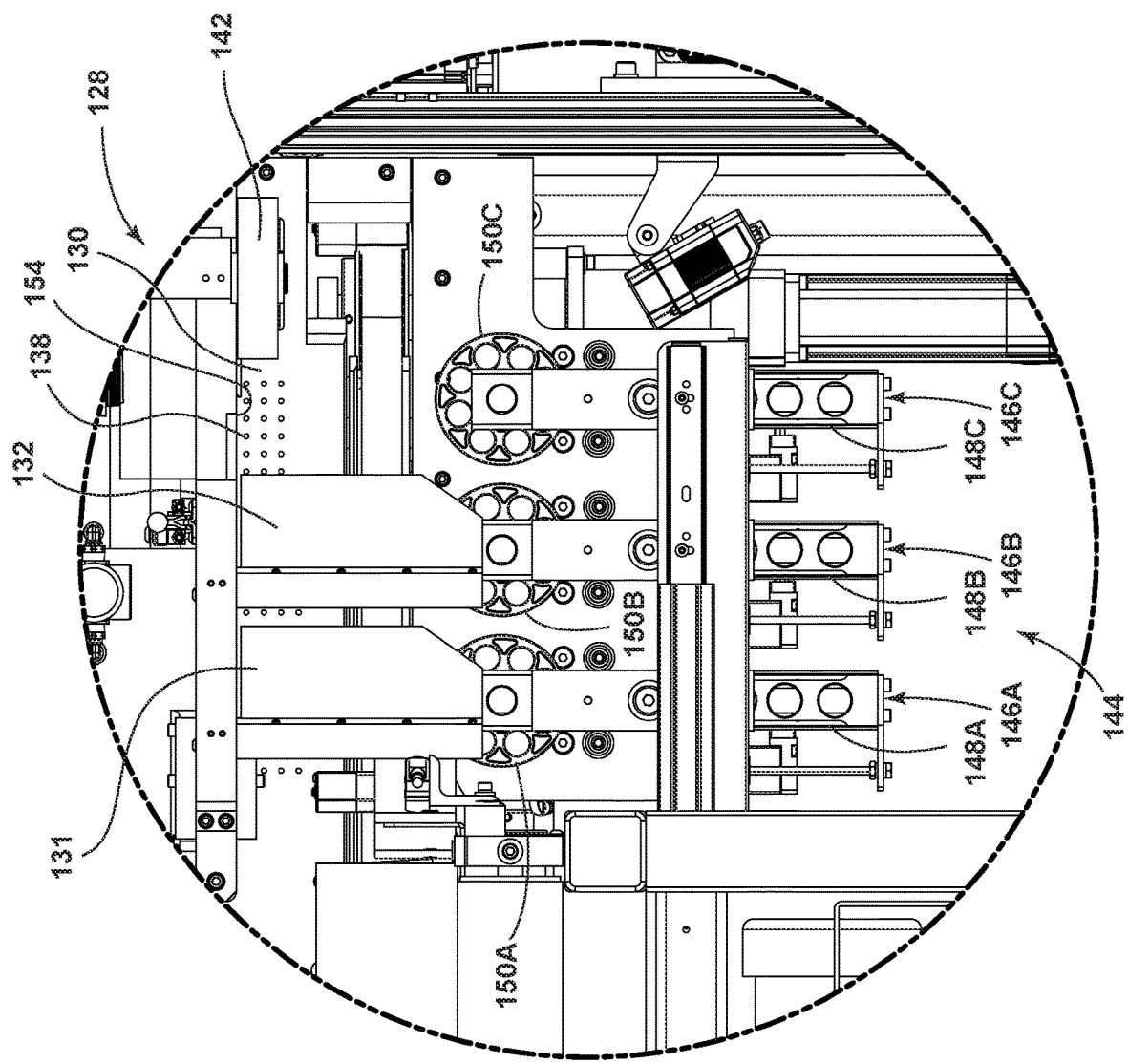
FIG. 9A is an enlarged view of a portion of the stamp applicator of FIG. 9 showing an induction assembly.
Figure 10:
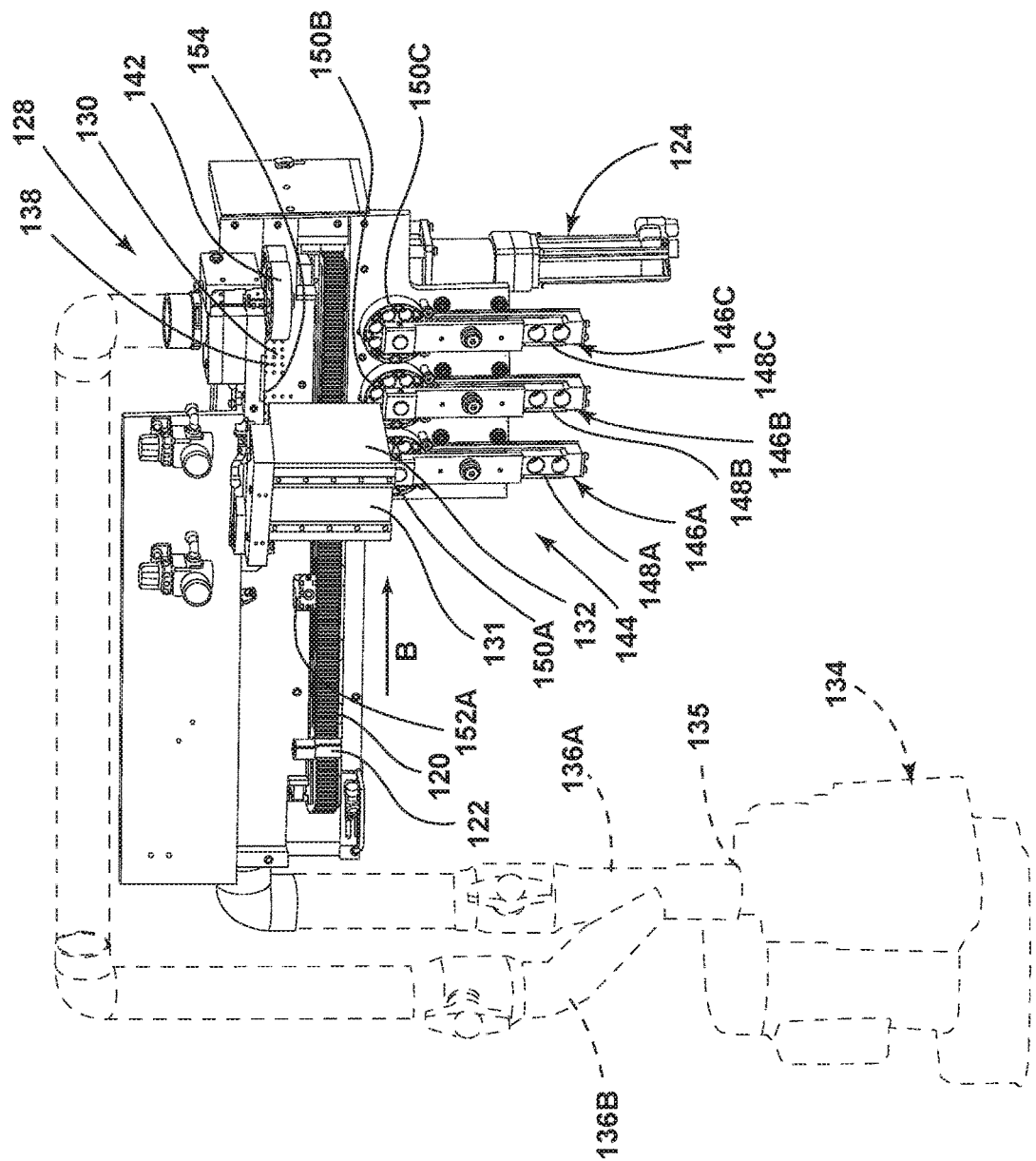
FIG. 10 is an isometric view of an induction assembly of the stamp applicator of FIGS. 8 and 9.
Figure 11:
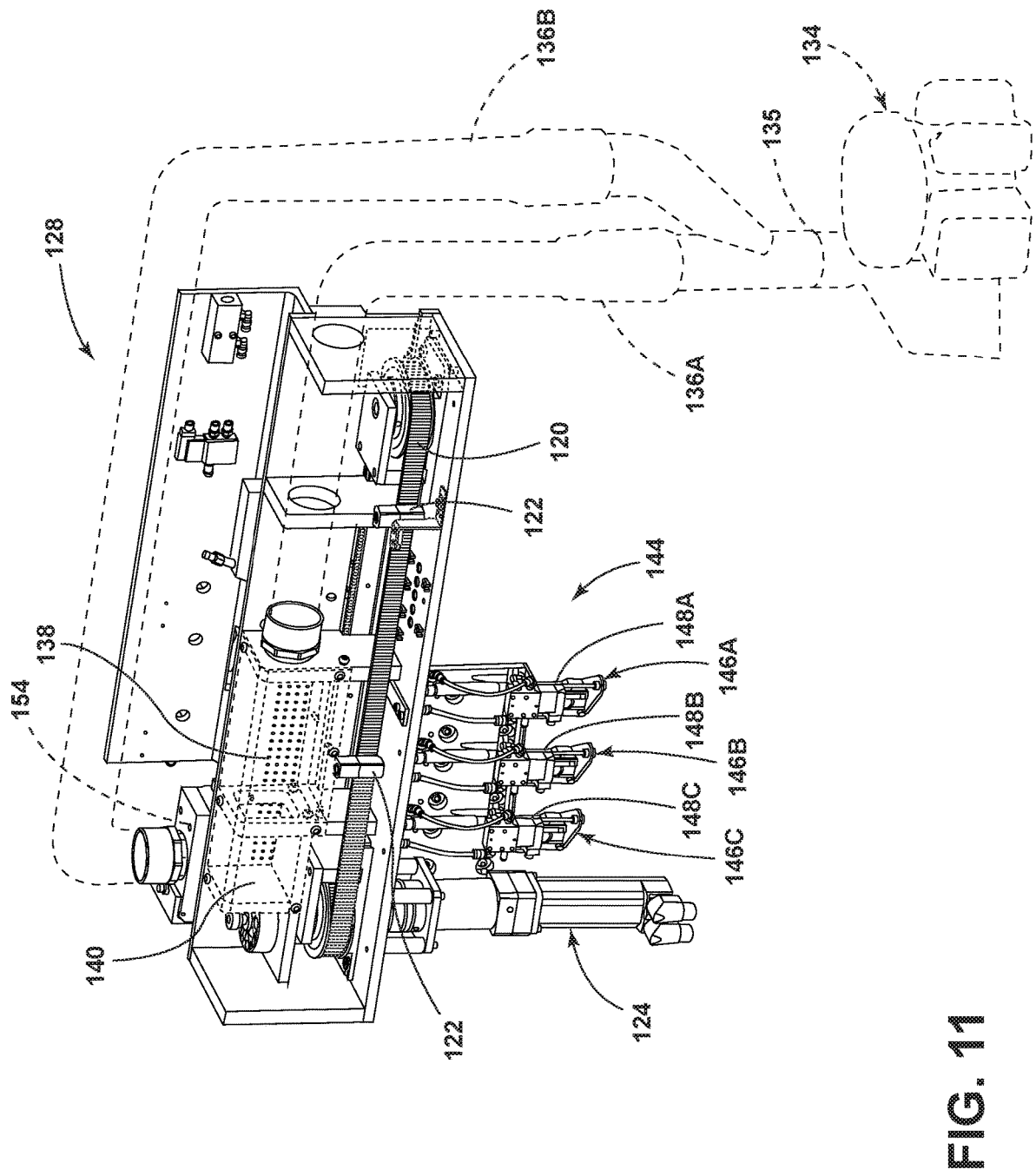
FIG. 11 is an isometric view of the induction assembly of FIG. 10.

With reference to FIGS. 9A, 10, and 11, induction assembly 128 includes a powered actuator such as an electric servo gearmotor 124 that drives a conveyor such as cogged input belt 120. Input belt 120 includes cogs or dogs 122 that are configured to push cartons 4 in the direction of the arrow "B" (FIG. 10) after the cartons 4 are moved into engagement with cogged belt 120 on input conveyor 102 (FIG. 8). Controller 103 may be configured to move input belt 120 (via actuator 124) at a constant speed, or at a variable speed (e.g. starting and stopping movement). As the cartons 4 move through the induction assembly 128 in the direction of the arrow B the cartons 4 are biased towards an upright plate 130 by optional first and second resilient flaps 131 and 132. The upright plate 130 includes a plurality of vacuum openings 138 that are fluidly connected to a vacuum chamber 140 (FIG. 11). A powered vacuum device 134 includes a vacuum inlet 135 that is fluidly connected to vacuum lines 136A and 136B. Vacuum line 136A is operably connected to vacuum chamber 140 to provide a vacuum at vacuum openings 138 of upright plate 130. The vacuum at vacuum openings 138 slidably retains cartons 4 against the upright plate 130 as the cartons move through the induction assembly 128. An optional roller 142 also biases cartons 4 against upright plate 130 as cartons 4 exit induction assembly 128 and enter opening station 110. As discussed below, roller 142 may be configured to pinch the cartons 4 along the tops of the cartons 4 to assist in opening the flaps of the carton.

With reference to FIGS. 10 and 11, induction assembly 128 includes a powered lift arrangement 144 including first, second, and third powered lift assemblies 146A, 146B, and 146C, respectively that are operably connected to controller 103. Powered lift assemblies 146A-146C include linear powered actuators 148A-148C, respectively that are configured to vertically shift rollers 150A-150C, respectively. The linear powered actuators 148A-148C may comprise pneumatic cylinders that are operably connected to controller 103 to provide powered upward movement of rollers 150A-150C, and powered downward movement of rollers 150A-150C. Linear powered actuators 148A-148C are capable of shifting rollers 150A-150C both upwardly and downwardly very rapidly at specific controlled times. One or more sensors 152A (FIG. 10) are configured to detect the presence and location of cartons 4 moving through induction assembly 128.

Controller 103 is configured to actuate the powered actuators 148A-148C in a predefined manner to shift cartons 4 upwardly against a datum surface 154 such that upper surfaces of the cartons are positioned at a vertical location corresponding to the datum 154 regardless of the overall height of cartons 4. Specifically, controller 103 may be configured to actuate linear powered actuators 148A, 148B, and 148C in sequence as a carton moves over rollers 150A-150C to shift cartons 4 upwardly very rapidly in a precisely timed and controlled manner. After cartons 4 exit induction assembly 128 and enter opening station 112, controller 103 actuates the powered actuators 148A-148C to lower rollers 150A-150C under power in a rapid, controlled manner such that the rollers 150A-150C are quickly returned to a lower position whereby another carton 4 can be shifted into position over the rollers 150A-150C. The ability to precisely time and control the powered actuators 148A and 148C utilizing input from sensor 152A permits the induction assembly 128 to move cartons 4 through the induction assembly 128 at a very high rate of speed that is not possible with other height adjustment assemblies.

Figure 12A:
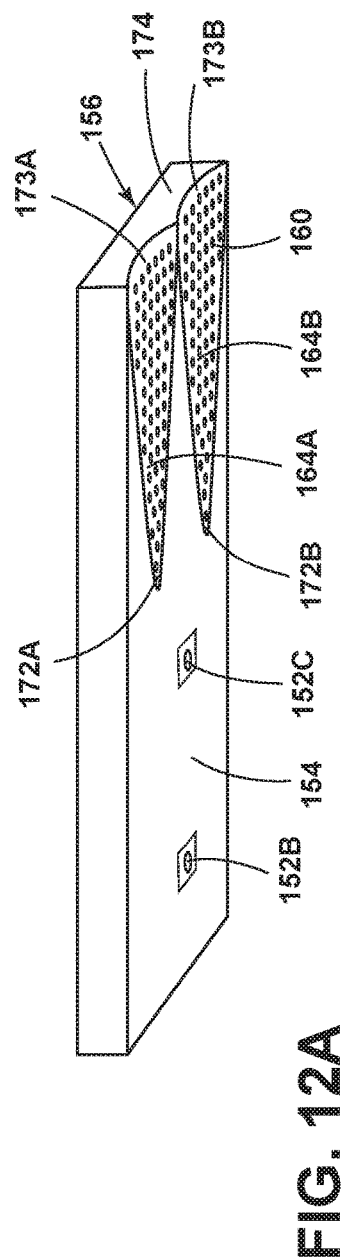
FIG. 12A is an isometric view of a portion of the induction assembly of FIG. 12.

With further reference to FIGS. 12 and 12A, datum 154 may comprise a lower surface of a vacuum block 156 having a plurality of vacuum bores/holes 158 through block 156 forming vacuum openings 160 on a lower side of block 156. Proximity sensors 152B and 152C may be positioned flush with lower datum surface 154 to detect the presence of a carton 4 against datum surface 154. Sensors 152B and 152C are operably connected to controller 103. Controller 103 may be configured to halt operation of conveyors 106 and/or 120 if sensors 152B and 152C do not simultaneously detect the presence of a carton 4. Controller 103 may also be configured to halt main conveyor 106 if the combination of inputs from sensors 152A-152C indicate that a carton is present, but the carton 4 is not properly oriented. In general, sensors 152A-152C are configured to simultaneously detect the presence of a carton 4 if the carton 4 is properly positioned.

Vacuum openings 158 may be fluidly connected to vacuum line 136 by a manifold 162. The block 156 may include a flat surface portion forming datum 154, and a pair of concave surfaces 164A and 164B, with vacuum openings 160 being located at the concave surface portions 164A and 164B. As cartons 4 move through the induction assembly 128 in the direction of the arrow B, flaps 166A and 166B of carton 4 are pulled upwardly against concave curved surfaces 164A and 164B due to vacuum applied by vacuum openings 160.

As shown in FIG. 12A, the concave surfaces 164A and 164B may be approximately conical with upstream portions 172A and 172B that are relatively narrow and shallow, tapering to the surface 154. The concave surfaces 164A and 164B also include wider and deeper downstream portions 173A and 173B, respectively that are located adjacent downstream end 174 of block 156. As cartons 4 move along block 156 (due to cogged belt 120), the leading edges 167A and 167B of flaps 166A and 166B are gradually pulled upwardly and open to form a gap 168 between the flaps 166A and 166B and an upper edge of carton 4.

Figure 12B:
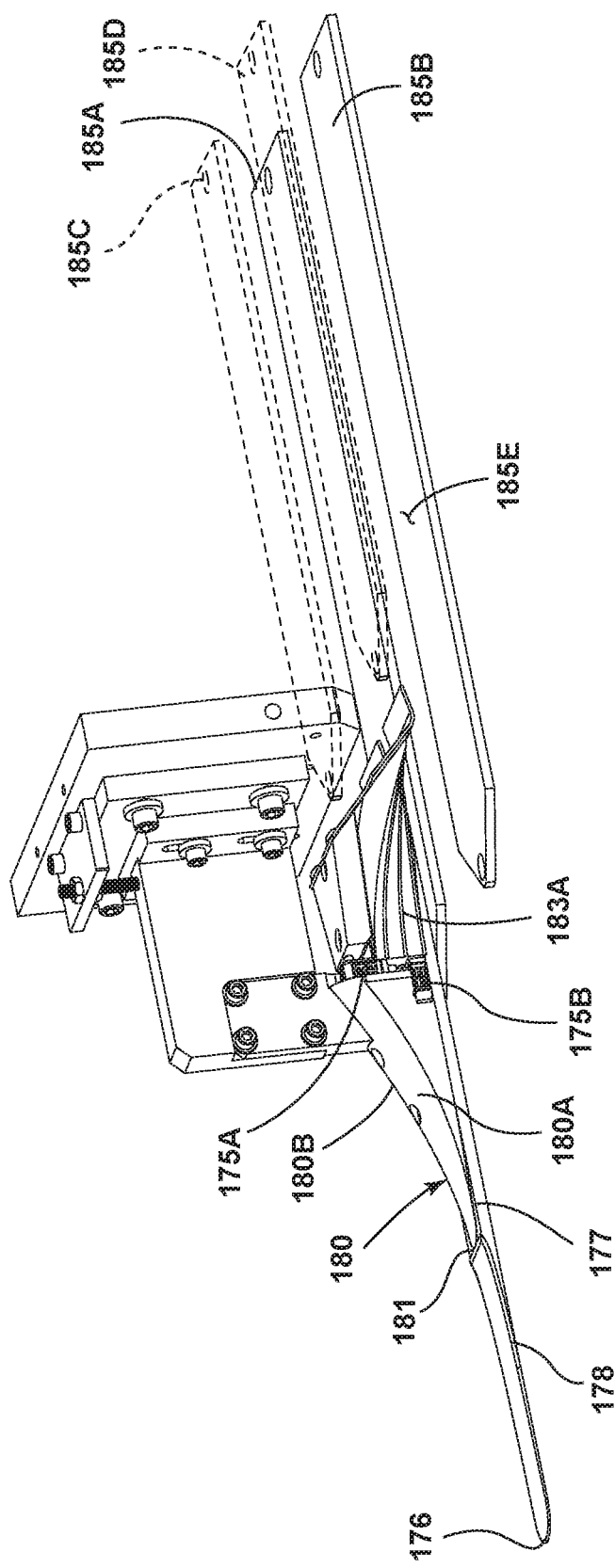
FIG. 12B is an isometric view of a portion of the opening station of FIG. 12.
Figure 12C:
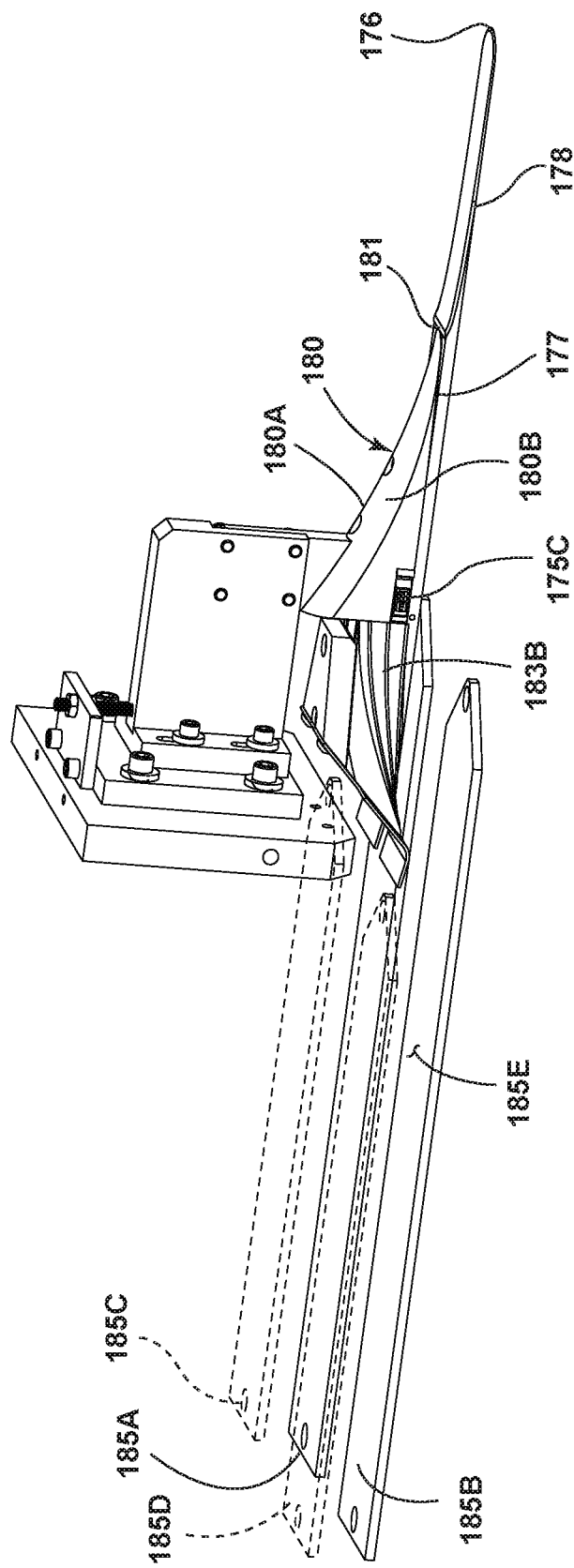
FIG. 12C is an isometric view of a portion of the opening station of FIG. 12.

As cartons 4 continue to move through induction assembly 128, leading end 34 of carton 4 moves into opening station 110. Carton opening station 110 includes a horizontally extending blade member 178 (FIGS. 12, 12B, 12C) having a tip 176 that enters gap 168 under flaps 166A and 168B as cartons 4 move in the direction of the arrow B. Blade 178 ensures that flaps 166A and 166B remain at least partially open while the cartons 4 move from induction assembly 128 into opening station 110. An opener 180 (see also FIGS. 12B and 12C) includes tapered surfaces 180A and 180B that are located above a base portion 177 of blade 178. Opener 180 may comprise low friction polymer or other suitable material. The surfaces 180A and 180B of opener 180 have a forward tip portion 181 that is located a distance "L" from tip 176 of blade 178. The length L may be quite large (i.e. about 0.40-0.80 of the length of cartons 4), such that the flaps 166A and 166B remain engaged with blade 178 without opening fully until the flaps 166A and 166B encounter tapered surfaces 180A and 180B of opener 180. As shown in FIG. 12, the tip 176 of blade 178 may be positioned directly adjacent downstream end 174 of block 156 (e.g. less than 1 inch, 1 inch, or 2 inches), and tip 176 can be positioned precisely relative to block 156 so that the tip 176 enters gap 168 immediately after leading end 34 of cartons 4 move past trailing end 174 of block 156. Because the distance L is of sufficient length, the leading edges 167A and 167B of flaps 166A and 166B do not contact forward tip 181 of tapered surfaces 180A and 180B until trailing end 35 of carton 4 is approaching end 174 of block 156. The blade 178 guides the flaps 166A and 166B and ensures that the flaps 166A and 166B are properly aligned with the tapered surfaces 180A and 180B despite the fact that the leading edge 181 of tapered surfaces 180A and 180B is located a significant distance from downstream end 174 of block 156. In this way, the concave surfaces 164A and 164B with vacuum openings 160, and the blade 178 cooperate to ensure that the flaps 166A and 166B are opened consistently. It will be understood that if tapered surfaces 180A and 180B were to be positioned directly adjacent block 156, the surfaces 180A and 180B would tend to rotate flaps 166A and 166B upwardly while portions of the flaps 166A and 166B are still under the block 156, thereby damaging the flaps. Conversely, if the tapered surfaces 180A and 180B are positioned away from block 156, but no blade 178 is utilized, the flaps 166A and 166B may not form a consistent gap 168, and the tapered surfaces 180A and 180B would likely not consistently engage the flaps 166A and 166B properly for opening.

Curved guide surfaces 183A and 183B (FIGS. 12B, 12C) further rotate the flaps 166A and 166B to fully open positions. Flaps 166A and 166B are then retained in fully open positions in gap 185E between lower guides 185A, 185B and upper guides 185C, 185D. It will be understood that guides 185A-185D may be substantially similar to known guides used in existing stamping machines.

Figure 12D:
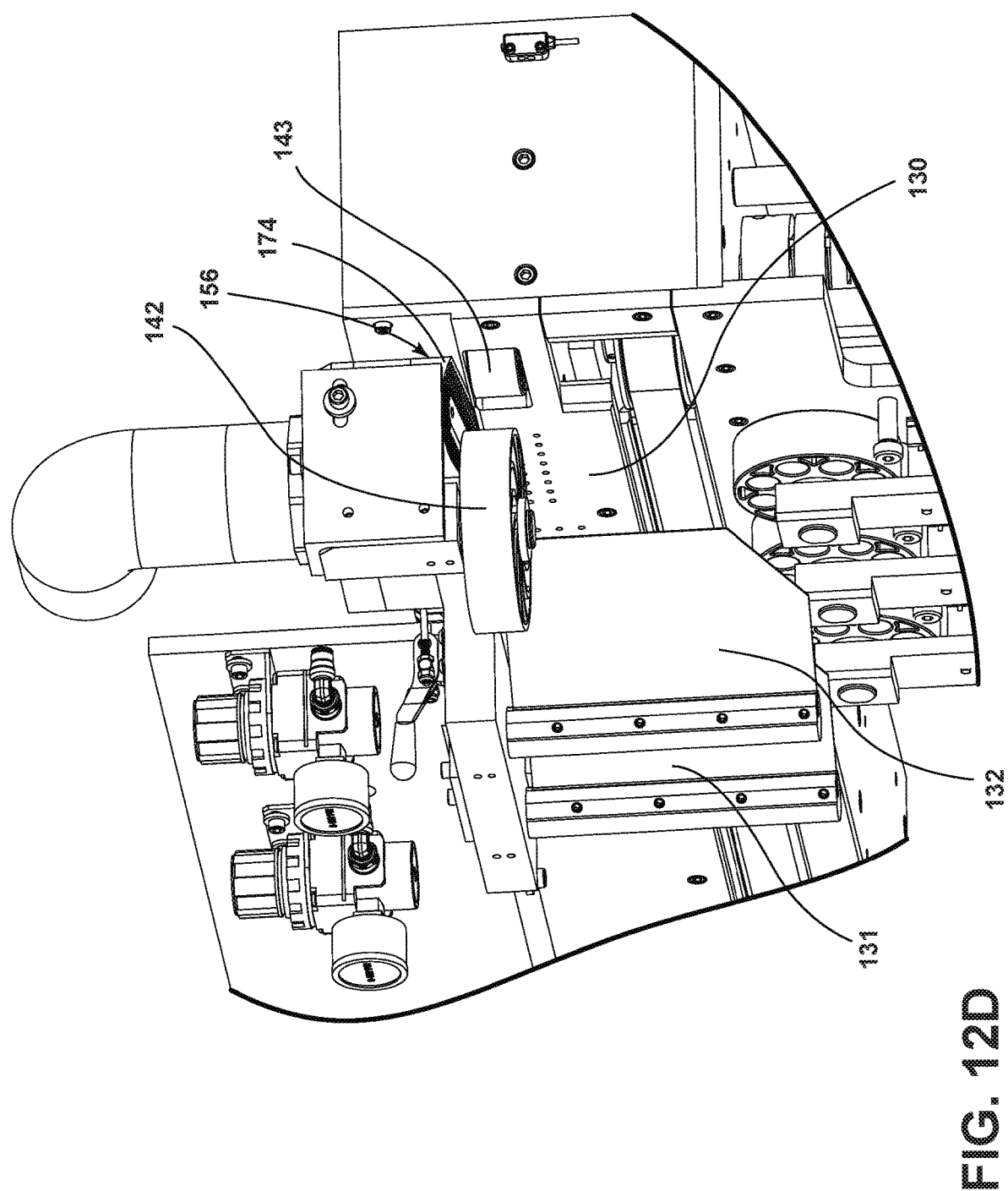

Rollers 142 and 143 (FIG. 12D) may be positioned adjacent downstream end 174 of block 156. Rollers 142 and 143 press against sides 62A and 62B of carton 4 to compress the carton 4 and assist in opening flaps 166A and 166B to form gap 168.

Referring again to FIGS. 12B and 12C, opening station 110 may include sensors 175A, 175B, and 175C. Sensors 175A-175C may comprise proximity sensors that are configured to detect if a flap 166A or 166B is present (i.e. open) as the cartons move below opener 180, and send the information to controller 103. Sensors 175A and 175B are positioned to detect flaps 166A, 166B on a first side of carton 4, and sensor 175C is configured to detect flaps 166A, 166B on the other side of carton 4. The sensors 175A-175C are positioned adjacent or downstream from the tapered opening surfaces 180A and 180B of opener 180. If the flaps 166A, 166B have been properly opened, the sensors 175A-175C detect the presence of the open flaps 166A, 166B, and controller 103 causes the main conveyor 106 to continue moving a carton through the opening station 110. However, if the sensors 175A-175C do not detect an open flap, controller 103 shuts down main conveyor 106 to prevent damage to the carton 4 and/or other items.

Sensors 175A, 175B, and 175C are mounted on opposite sides of opener 180. Sensors 175B and 175C are positioned at a relatively low height, such that sensors 175B and 175C will detect both shorter flaps 166A and larger flaps 166B if the flaps are open as the flaps move past the sensors 175B and 175C. However, sensor 175A is positioned at a greater height, and sensor 175A only detects an open, larger flap. Thus, if sensors 175B and 175C both detect an open flap, and sensor 175A does not detect an open flap, this indicates that the large flap is on the side adjacent sensor 175C. Conversely, if sensor 175A detects a flap, controller 103 then determines that the large flap of a particular carton 4 is on the side adjacent sensor 175A.

Thus, the sensors 175A-175C not only determine if both flaps have been properly opened, but also determine the orientation of carton 4 (i.e. which sides the larger and smaller flaps are on). Controller 103 is configured to "track" each carton 4 as it moves through the stamping machine 1. As discussed below, controller 103 is configured to utilize the orientation information for each carton 4 during operation of the closing station 114 as described below. Because the speed of the main conveyor 106 is known, the distance each carton 4 travels can be determined by controller 103 to thereby track each carton 4 as it moves through the stamping machine 100. It will be understood that the stamping machine 100 may include proximity sensors at various locations throughout the machine 100 to detect the presence of a carton 4 moving through the machine 100, and this information is supplied to the controller 103 to assist the controller 103 in tracking the location of each carton 4 passing through the machine 100.

The stamping station 112 may have a construction and operation that is substantially similar to existing stamping stations, such that the details of stamping station 112 are not described in detail herein. With further reference to FIG. 13, after cartons 4 are stamped at stamping station 12, the cartons 4 move from upstream segment 106A of main conveyor 106 to downstream segment 106B of main conveyor 106. The cartons 4 move across transition or gap 109 between conveyor segments 106A and 106B as the cartons 4 move from the stamping station 112 to the closing station 114. As discussed above in connection with FIG. 5, the belts 58 and 60 have high friction surfaces 59 and 61 that grip the sides of cartons 4, and resilient pulleys 56D deform to bias the surfaces of the belts 58 and 60 into contact with vertical side surfaces or faces 62A and 62B of cartons 4, thereby retaining the cartons 4 at a constant height as the cartons 4 move through the stamping station 112 and closing station 114. Significantly, the cartons 4 are held at a specific height that is initially set at induction assembly 128 solely by friction of belts 58 and 60, and the cartons 4 are not biased upwardly as the cartons 4 move through opening station 110, stamping station 112, and closing station 114.

Referring again to FIG. 13, closing station 114 includes a pair of stationary guides 182 at an upstream end 114A of closing station 114. Guides 182 may comprise stationary polymer "blocks" having curved/twisted guide surfaces 184A and 184B, respectively. The guide surfaces 184 have substantially flat, horizontal upstream portions 186 that twist and transition to substantially vertical surfaces 187. As cartons 4 move between guides 182 the flaps 166A and 166B of carton 4 are rotated from a horizontal (fully open) position to an upright position by the surfaces 186 and 187.

Cartons 4 typically have a large flap 166A, and a smaller flap 166B. Closing station 114 is configured to always close small flap 166B first, regardless of the orientation of carton 4. In FIG. 13, the larger flap 166A is shown on a "left" side of carton 4 (if viewing carton 4 from an upstream location), and a smaller flap 166B on the right hand side. However, cartons 4 may enter machine 100 with flaps 166A and 166B oriented on either side. During the closing operation, small flap 166B must be closed first, and glue is then applied to the small flap 166B by a glue nozzle 188. The large flap 166A is then folded onto the small flap 166B to thereby adhesively secure flaps 166A and 166B together. Significantly, closing station 114 is configured to close large flaps 166A and small flaps 166B in the proper sequence, regardless of the orientation of carton 4.

As discussed above, sensors 175A-175C (FIG. 12) determine the orientation of the large and small flaps of each carton 4, and controller 103 tracks each carton 4 as it moves through the machine 100. Thus, controller 103 "knows" the orientation of each carton 4 entering the closing station 114.

After the flaps of each carton 4 are initially rotated to a vertical position by guide surfaces 184A and 184B, cartons 4 then move past a guide 190. Guide 190 is generally cylindrical, and retains the flaps in a vertical orientation. Guide 190 may have larger and smaller cylindrical surfaces 190A and 190B, respectively, with a tapered surface 190C between cylindrical surfaces 190A and 190. Surfaces 190A-190C are configured to slidably retain the flaps 166A, 166B in a vertical position. Closing station 114 also includes powered arm devices 192A, 192B, 192C, and 192D. The powered arm devices 192 are operably connected to controller 103, and the powered arm devices 192A-192D are actuated in a specific sequence depending on the orientation of the carton 4. The powered arm devices 192A and 192B form an upstream pair of powered arm devices, and the powered arm devices 192C and 192D form a downstream pair of powered arm devices. If a given carton 4 is oriented such that a small flap 166B is oriented on the side adjacent powered arm device 192B, controller 103 will actuate powered arm device 192B as carton 4 passes between powered arm devices 192A and 192B to close the small flap 166B. However, powered arm device 192B is not actuated if the small flap 166B is on the side adjacent powered arm device 192A.

As the carton 4 continues to move through the closing station 114, a movable glue nozzle 188 applies glue to the top of the small flap 166. The glue nozzle 188 may be mounted to a powered mechanism that moves the glue nozzle 188 between positions "188" and "188A" as shown by the arrow "G" to properly align the glue nozzle 188 and apply glue to the smaller flap 166B. Movable glue nozzles of this type are generally known, such that a detailed description of the glue nozzle 188 is not believed to be required.

As a carton 4 continues to move through the closing station 114, after glue is applied to the small flap 166, one of the powered arm devices 192C or 192D is actuated by controller 103 to close the large flap 166A onto the small flap 166B, thereby gluing the carton 4 shut. If the large flap 166A is positioned adjacent powered arm device 192D, controller 103 actuates powered arm device 192D to close the large flap 166A, without actuating powered arm device 192C.

Thus, for each carton 4 one of the upstream powered arm devices 192A, 192B is initially actuated to close the small flap 166A, and one of the downstream powered arm devices 192C or 192D is actuated to close the large flap 166A after glue is applied to small flap 166B. Thus, controller 103 may actuate powered arm device 192A, followed by actuation of powered arm device 192D, or the controller 103 may actuate powered arm device 192B followed by actuation of powered arm device 192C. After the flaps are glued shut, cartons 4 pass through speed regulating station 116, and cartons 4 are then moved to exit conveyor 118.

A powered arm device 192A is shown in more detail in FIGS. 14-16. It will be understood that powered arm devices 192A and 192C are substantially identical. Also, powered arm devices 192B and 192D are mirror images of powered arm device 192A. Powered arm device 192A includes an arm 194 that is fixed to a vertical pin 196 that is rotatably interconnected to a support structure 195 for rotation about a vertical axis "V." Pin 196 is retained at a fixed vertical position in support structure 195 by retainers 189. Arm 194 includes an adjustable end 205 having a flap-engaging lower surface 202. The rod 205 may comprise a threaded screw or the like that is retained by a nut 206 to provide adjustment of the location of flap-engaging surface 202. A powered actuator such as a pneumatic cylinder 198 is operably connected to a crank arm 197. Crank arm 197 is fixed to pin 196, such that actuation of powered actuator 198 causes pin 196 to rotate about vertical axis V as shown by the arrow "R," thereby rotating arm 194. Powered actuator 198 is operably connected to controller 103, and controller 103 is configured to actuate the powered actuator 198 at specific times as described above in connection with FIG. 13.

Arm 194 includes a base 194A that is fixed to pin 196, and an end portion 194B that is pivotably connected to base 194A by a pin 191 for rotation about a horizontal axis. A spring-biased plunger 204 biases end portion 194B of arm 194 upwardly about pin 191.

A guide plate 199 is secured to the support structure 195. Guide plate 199 includes an angled or tapered lower cam surface 200 that slidably engages upper surface 201 of arm 194. The angled cam surface 200 thereby causes end 194B of arm 194 to rotate about pin 191 as shown by the arrow "H" (FIG. 16) to move surface 202 and rod 205 vertically as arm 194 rotates about vertical axis V upon actuation of powered actuator 198.

During operation, as arm 194 rotates towards a carton 4 upon actuation of powered actuator 198, the arm 194 slides along cam surface 200, thereby shifting end 194B of arm 194 downwardly. The downward motion of flap-engaging end surface 202 thereby closes the flaps of the carton 4.

With reference to FIGS. 14, 14A, 14B, the powered arm closing device 192A may include one or more pairs of upper rollers 193 that are positioned directly above a resilient pulley 56 and belt 58. Roller 193 may be freely rotating (i.e. not powered). Rollers 193 engage and support the sides of the cartons adjacent the flaps 166A, 166B. This allows (causes) the flaps 166A, 166B to remain parallel to each other as vertically actuated rollers 193A push the large flaps down into the glue on the small flap.

The tax stamping machine of the present invention is configured to provide very rapid, high speed processing of cartons of cigarettes during tax stamping operations. In particular, the tax stamping machine 100 is configured to stamp at most 150 cartons of cigarettes per minute. The unique powered induction assembly 128, conveyor 106, and closing station 114 facilitate very high speed operation. Also, the speed regulating device 116 slows down the speed of the cartons 4 prior to positioning the cartons 4 on exit conveyor 118. The unique combination of features of the tax stamping machine permit very high speed operation that is not possible with conventional tax stamping machines.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A stamping machine for stamping packs of cigarettes disposed in cartons, the stamping machine comprising:
    an opening station that is configured to open flaps of the cartons;
    a stamping station that is configured to stamp the individual packs of cigarettes in the cartons after the flaps are opened;
    a closing station that is configured to close the flaps of cartons after individual packs of cigarettes in the cartons have been stamped; and
    a powered conveyor system that is configured to move cartons in a downstream direction along a carton path through the opening station, the stamping station, and the closing station, wherein the powered conveyor system includes looped belts having gripping surfaces, that are configured to grip oppositely-facing upright side faces of cartons between the looped belts, wherein the gripping surfaces are configured to retain the cartons at a substantially fixed vertical location as the cartons move through the opening station, the stamping station, and the closing station such that a support contacting lower surfaces of the cartons is not required to retain the cartons at the substantially fixed vertical location as the cartons move through the opening station, the stamping station, and the closing station.

2. The stamping machine of claim 1, wherein:
    the first and second looped belts are movably supported by a plurality of resilient pulleys, the resilient pulleys including flexible rims that resiliently deform as cartons move along the belts such that resilient pulleys generate forces clamping the cartons.

3. The stamping machine of claim 1, including:
    at least one powered actuator configured to push cartons upwardly into contact with a downwardly-facing surface.

4. The stamping machine of claim 1, including:
    a speed-regulating device at a downstream end of the powered conveyor system, the speed regulating device having a powered carton-engaging member that reduces a speed of cartons exiting the downstream end of the powered conveyor system.

5. A stamping machine for stamping packs of cigarettes disposed in cartons, the stamping machine comprising:
an opening station that is configured to open flaps of the cartons;
a stamping station that is configured to stamp the individual packs of cigarettes in the cartons after the flaps are opened;
a closing station that is configured to close the flaps of cartons after individual packs of cigarettes in the cartons have been stamped;
a powered conveyor system that is configured to move cartons in a downstream direction along a carton path through the opening station, the stamping station, and the closing station, wherein the powered conveyor system includes looped belts having gripping surfaces that are configured to grip oppositely-facing upright side faces of cartons between the looped belts, wherein the gripping surfaces are configured to retain the cartons at a substantially fixed vertical location as the cartons move through the opening station, the stamping station, and the closing station, wherein the looped belts define an upstream end of the powered conveyor having an entrance and a downstream end having an exit; and
an induction assembly upstream of the opening station, the induction assembly including a downwardly-facing locating surface and an induction drive assembly that moves cartons through the induction assembly and at least one powered actuator that shifts cartons upwardly into contact with the downwardly-facing locating surface to position top surfaces of cartons at a predefined vertical location before cartons move into the entrance.

6. The stamping machine of claim 5, including:
a sensor configured to detect the presence of a carton entering the induction assembly; and
a controller configured to actuate the at least one powered actuator if a carton is detected by the sensor.

7. The stamping machine of claim 6, wherein:
the at least one powered actuator comprises first, second, and third powered actuators.

8. The stamping machine of claim 7, wherein:
the first, second, and third powered actuators are arranged in a row along the carton path; and
wherein the controller is configured to sequentially actuate the first, second, and third actuators to shift cartons upwardly.

9. The stamping machine of claim 5, wherein:
the induction assembly includes an upright carton-engaging surface having a plurality of vacuum openings; and including:
a powered vacuum system that is configured to create vacuums at the vacuum openings to slidably retain cartons against the carton-engaging surface while the cartons are shifted upwardly.

10. The stamping machine of claim 5, including:
a downwardly-facing flap opening surface having a plurality of vacuum openings that are configured to pull flaps of cartons upwardly into contact with the flap opening surface;
and wherein the opening station includes an elongated flap engaging member that is configured to be positioned under flaps of cartons while the flaps are slidably disposed against the flap opening surface and the cartons are moved into the opening station by the induction drive assembly.

11. The stamping machine of claim 10, wherein:
the flap opening surface includes first and second concave surface portions, each having a plurality of vacuum openings to pull first and second flaps of cartons upwardly against the first and second concave surface portions to form a gap between the first and second flaps whereby the elongated flaps engaging member moves into the gap as cartons move into the opening station.

12. The stamping machine of claim 5, wherein:
the opening station includes a flap opening surface having a downstream end; and including:
a flap engaging member having a downstream base and an upstream tip positioned directly adjacent the downstream end of the flap opening surface whereby forward portions of flaps of each carton slidably engage the flap engaging member and rear portions of the flaps of each carton simultaneously engage the flap opening surface, and wherein a forward portion of each carton is received in the entrance of the powered conveyor while rearward portions of the flaps of each carton are in contact with the flap opening surface.

13. The stamping machine of claim 12, wherein:
the opening station includes tapered wedge surfaces above the base of the blade that are configured to rotate flaps of cartons open as the flaps slide along the blade.

14. A stamping machine for stamping packs of cigarettes disposed in cartons, the stamping machine comprising:
an opening station that is configured to open flaps of the cartons;
a stamping station that is configured to stamp the individual packs of cigarettes in the cartons after the flaps are opened;
a closing station that is configured to close the flaps of cartons after individual packs of cigarettes in the cartons have been stamped;
a powered conveyor system that is configured to move cartons in a downstream direction along a carton path through the opening station, the stamping station, and the closing station, wherein the powered conveyor system includes looped belts having gripping surfaces that are configured to grip oppositely-facing upright side faces of cartons between the looped belts, wherein the gripping surfaces are configured to retain the cartons at a substantially fixed vertical location as the cartons move through the opening station, the stamping station, and the closing station, wherein the looped belts define an upstream end of the powered conveyor having an entrance and a downstream end having an exit;
an induction assembly upstream of the opening station, the induction assembly including an induction drive assembly that moves cartons through the induction assembly and first, second, and third powered actuators that shift cartons upwardly to position top surfaces of cartons at a predefined vertical location before cartons move into the entrance, wherein the first, second, and third powered actuators are arranged in a row along the carton path, and wherein the first, second, and third actuators comprise linear actuators, each having a movable member that shifts linearly upon actuation;
a sensor configured to detect the presence of a carton entering the induction assembly;
a controller configured to sequentially actuate the first, second, and third actuators to shift cartons upwardly if a carton is detected by the sensor; and a roller mounted to each movable member such that the rollers contact lower sides of cartons to shift the cartons upwardly.

15. The stamping machine of claim 14, wherein:
the linear actuators comprise pneumatic cylinders that are configured to shift the movable members upwardly and downwardly under power.

16. The stamping machine of claim 15, wherein:
the induction assembly includes a downwardly-facing locating surface above the rollers;
the rollers shift the cartons upwardly and cause upper surfaces of the cartons to contact the downwardly-facing locating surface when the pneumatic cylinders are actuated to shift the movable members upwardly.

17. A stamping machine for stamping packs of cigarettes disposed in cartons, the stamping machine comprising:
an opening station that is configured to open flaps of the cartons;
a stamping station that is configured to stamp the individual packs of cigarettes in the cartons after the flaps are opened;
a closing station that is configured to close the flaps of cartons after individual packs of cigarettes in the cartons have been stamped;
a powered conveyor system that is configured to move cartons in a downstream direction along a carton path through the opening station, the stamping station, and the closing station, wherein the powered conveyor system includes looped belts having gripping surfaces that are configured to grip oppositely-facing upright side faces of cartons between the looped belts, wherein the gripping surfaces are configured to retain the cartons at a substantially fixed vertical location as the cartons move through the opening station, the stamping station, and the closing station;
wherein the stamping machine is configured to open and close cartons having larger and smaller flaps; and includes:
a sensing arrangement configured to detect at least one open flap of cartons being processed by the stamping machine, whereby the controller determines the orientation of the cartons;
the closing station includes a glue applicator and four powered flap closing devices, including a pair of upstream flap closing devices, and a pair of downstream flap closing devices, and wherein the controller is configured to actuate one upstream flap closing device to close a small flap of a carton, followed by actuation of the glue applicator to apply glue to an upper surface of the small flap after the small flap is closed, followed by actuation of one downstream flap closing device to close a large flap over the smaller flap whereby the small flap is adhered to the large flap in a closed position.

18. The stamping machine of claim 17, wherein:
each powered flap closing device includes an arm and a powered actuator that moves the arm upon actuation of the powered actuator.

19. The stamping machine of claim 18, wherein:
each arm pivots about an upright axis and simultaneously translates along the upright axis upon actuation of the powered actuator.

20. The stamping machine of claim 19, wherein:
each arm is rotatably and slidably mounted to a pin;
each powered flap closing device including a spring resiliently biasing the arm upwardly along the pin, and an angled cam engaging the arm whereby actuation of the actuator of the powered flap closing device causes the arm to rotate about the pin and simultaneously engage the angled cam, the angled cam causing the arm to move downwardly as the arm rotates to thereby close a flap of a carton.

21. The stamping machine of claim 20, wherein:
the pins of the upstream pair of powered flap closing devices are positioned on opposite sides of the carton path, and the pins of the downstream pair of powered flap closing devices are positioned on opposite sides of the carton path, and wherein the arms include end portions with flap-engaging surfaces, and wherein the flap-engaging surface of each arm moves inwardly over the carton path and downwardly to close a flap.

* * * * *